US009710634B2

(12) United States Patent
Fort et al.

(10) Patent No.: US 9,710,634 B2
(45) Date of Patent: Jul. 18, 2017

(54) USER-CONVENIENT AUTHENTICATION METHOD AND APPARATUS USING A MOBILE AUTHENTICATION APPLICATION

(71) Applicant: Vasco Data Security, Inc., Oakbrook Terrace, IL (US)

(72) Inventors: Nicolas Fort, Bordeaux (FR); Frank Coulier, Grimbergen (BE); Guilaume Teixeron, Le Bouscat (FR)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 25 days.

(21) Appl. No.: 13/958,075

(22) Filed: Aug. 2, 2013

(65) Prior Publication Data

US 2014/0040628 A1    Feb. 6, 2014

Related U.S. Application Data

(60) Provisional application No. 61/679,284, filed on Aug. 3, 2012.

(51) Int. Cl.
*G06F 21/00*    (2013.01)
*G06F 21/34*    (2013.01)
(Continued)

(52) U.S. Cl.
CPC ............ *G06F 21/34* (2013.01); *G06F 21/606* (2013.01); *H04L 63/0838* (2013.01);
(Continued)

(58) Field of Classification Search
CPC .......... G06F 21/36; G06F 21/31; G06F 21/10; G06F 21/57; G06F 2221/2107; H04L 63/083; H04L 63/08
(Continued)

(56) References Cited

U.S. PATENT DOCUMENTS 5,841,970 A * 11/1998 Tabuki .............................. 726/2
7,379,921 B1 * 5/2008 Kiliccote ....................... 705/75
(Continued)

FOREIGN PATENT DOCUMENTS

CN    101911584 A    12/2010
CN    101999132 A    3/2011
(Continued)

OTHER PUBLICATIONS

Choi et al., "A Mobile based Anti-Phishing Authentication Scheme using QR code," Mobile IT Convergency (IMIC), 2011 International Conference ON, IEEE, Sep. 26, 2011, pp. 109-113.
(Continued)

*Primary Examiner* — Ali Abyaneh
(74) *Attorney, Agent, or Firm* — RatnerPrestia

(57) ABSTRACT

Methods, apparatus, and systems for securing application interactions are disclosed. Application interactions may be secured by, at a user authentication device, capturing a signal emitted by an access device encoded with an authentication initiating message including an application identifier, decoding the signal and obtaining the authentication initiating message, retrieving the application identifier, presenting a human interpretable representation of the application identity to the user, obtaining user approval to generate a response message available to a verification server, generating a dynamic security value using a cryptographic algorithm that is cryptographically linked to the application identity, and generating a response message including the generated dynamic security value; making the response message available to a verification server; and, at the verification server, receiving the response message, verifying the response message including verifying the validity of the dynamic security value, and communicating the result of the verification of the response message to the application.

24 Claims, 6 Drawing Sheets

(51) Int. Cl.
*H04L 29/06* (2006.01)
*G06F 21/60* (2013.01)
*H04L 9/32* (2006.01)

(52) U.S. Cl.
CPC ...... *H04L 63/0853* (2013.01); *H04L 63/0869* (2013.01); *H04L 63/18* (2013.01); *H04L 9/3215* (2013.01); *H04L 9/3228* (2013.01); *H04L 9/3234* (2013.01)

(58) Field of Classification Search
USPC ........................................................ 713/182
See application file for complete search history.

(56) References Cited

U.S. PATENT DOCUMENTS

| | | | | |
|---|---|---|---|---|
| 8,607,043 | B2* | 12/2013 | Rahman et al. | 713/155 |
| 2002/0083004 | A1* | 6/2002 | Saneto | G06F 21/10 705/53 |
| 2008/0040285 | A1* | 2/2008 | Wankmueller | 705/67 |
| 2008/0140660 | A1* | 6/2008 | Masuda | G06F 17/3023 |
| 2010/0125509 | A1* | 5/2010 | Kranzley et al. | 705/17 |
| 2012/0096277 | A1* | 4/2012 | Perez Soria | 713/179 |

FOREIGN PATENT DOCUMENTS

| | | |
|---|---|---|
| EP | 2 166 697 A1 | 3/2010 |
| WO | 2009052548 A1 | 4/2009 |
| WO | WO 2009/101549 A2 | 8/2009 |
| WO | WO 2009101549 A2 * | 8/2009 |

OTHER PUBLICATIONS

International Search Report and Written Opinion for PCT/US2013/053433 mailed Oct. 21, 2013.

Chinese Office Action with partial English language translation for Application No. 201380049938.6, dated Apr. 6, 2017, 19 pages.

* cited by examiner

USER-CONVENIENT AUTHENTICATION METHOD AND APPARATUS USING A MOBILE AUTHENTICATION APPLICATION

This application claims priority to U.S. Provisional application Ser. No. 61/679,284 entitled User-Convenient Authentication Method and Apparatus Using a Mobile Authentication Application, filed on Aug. 3, 2012, the contents of which are incorporated fully herein by reference.

FIELD OF THE INVENTION

The invention relates to securing remote access to computers and applications and remote transactions over computer networks. More specifically, the invention relates to methods and apparatus for authenticating users to remote application servers.

BACKGROUND OF THE INVENTION

As remote access of computer systems and applications grows in popularity, the number and variety of transactions which are accessed remotely over public networks such as the Internet has increased dramatically. This popularity has underlined a need for security; in particular: how to ensure that people who are remotely accessing an application are who they claim they are, how to ensure that transactions being conducted remotely are initiated by legitimate individuals, and how to ensure that transaction data has not been altered before being received at an application server.

In the past, application providers have relied on static passwords to provide the security for remote applications. In recent years it has become evident that static passwords are not sufficient and that more advanced security technology is required.

An authentication technology which offers a significantly higher security level than static passwords is offered by 'strong authentication token devices'. Typical examples of strong authentication tokens are the products of the DIGIPASS® line, commercialized by Vasco Data Security Inc. of Chicago, Ill. (see the website http://www.vasco.com). A strong authentication token is an autonomous battery-powered device, dedicated to providing authentication and/or transaction signature functions, usually pocket-size, with its own display and keypad. In some cases the keypad is reduced to a single button or even completely omitted, in other cases the keypad can be a full keyboard. The display and keypad of a typical strong authentication token are non-removable and not user-serviceable, fully controlled by the token, and immune for interference by malicious software on a host computer. Therefore strong authentication tokens are considered to have a trustworthy user interface in contrast to, for example, PCs where there is always the possibility that malicious software such as a virus or a Trojan presents fake messages to the user, or captures whatever the user enters on the keypad, or reads in memory sensitive data associated with a security application or alters data before they are being signed. The main purpose of a strong authentication token is to generate dynamic security values which are usually referred to as 'One-Time Passwords' (OTPs) or dynamic passwords. Typically these OTPs are generated by cryptographically combining a secret that is shared between the token and a verification or authentication server with a dynamic value such as a time value, a counter value or a server challenge that is provided to the token, or a combination of these. Some strong authentication tokens can also use data (such as transaction data) that have been provided to the token as the dynamic value or in combination with any of the dynamic values mentioned above to generate a security value. In these cases the resulting security value is meant to indicate the user's approval of the data and the security value is usually referred to as an electronic signature or Message Authentication Code (MAC). In some cases cryptographically combining the secret with a dynamic value comprises performing a symmetric encryption or decryption algorithm (such as for example DES, 3DES or AES) over data related to the dynamic value and using the secret as a symmetric encryption or decryption key. In some cases cryptographically combining the secret with a dynamic value comprises performing a cryptographic hash function (such as for example SHA-1) that is keyed with the secret and using the data related to the dynamic value as input data to the hash function. Some strong authentication tokens consist of a device with a display and a keypad that is capable of communicating with an inserted smart card whereby the generation of the OTPs or MACs is partly done by the device itself and partly by the inserted smart card.

A typical way to provide data to a strong authentication token is by letting the user enter the data manually on the token's keypad. When the amount of data that has to be entered in this way exceeds a few dozen characters, this process may be perceived by users as too cumbersome.

A typical way to provide the generated OTPs or MACs from the authentication token to the system that needs to verify them, consists of the token displaying the generated OTP or MAC on its display and the user copying the displayed OTP or MAC into his or her PC (or other internet access device) which transmits this OTP or MAC to the application or authentication server where the validity of the OTP or MAC can then be verified. This however also requires some actions from the user that may be perceived as inconvenient.

Strong authentication tokens usually rely on symmetric cryptographic mechanisms to generate OTPs or MACs using symmetric secret keys that are shared between a strong authentication token and a verification server. This can be problematic if a user would like to use his or her token with several applications since all these application servers would then have to share the token's secret key(s) which in turn has the potential of creating security risks.

Another aspect of dedicated hardware strong authentication tokens is that they inevitably have a certain non-zero minimal cost. This can sometimes make the dedicated hardware strong authentication tokens less attractive for a number of applications for which the cost per user can sometimes be a critical factor.

What is needed is an authentication mechanism which offers on the one hand the same level of security as strong authentication tokens, but which on the other hand is very convenient for the user and can be easily used with several applications or application providers and is very cost-effective.

DISCLOSURE OF THE INVENTION

Aspects of the present invention are based on a combination of insights by the inventors such as, for example, the inventors' insight that several different applications can be secured with the same strong authentication token without the need for these different applications to all share the secrets of the token if these applications can rely for the verification of the OTPs and MACs generated by that token on a third party authentication server that is trusted by the applications and that has access to the token secrets.

An additional insight on which aspects of the invention are based is that the authentication process can be made very convenient for the user if the user's device that generates the OTPs or MACs comprises communication interfaces for exchanging data with computing devices whereby these communication interfaces can be assumed to be omnipresent with respect to the targeted applications (e.g. web-based applications) and the typical access devices, e.g. Personal Computers (PCs) or laptops, that users can be expected to use to access these applications without requiring the users to engage in potentially complicated and error prone technical steps such is installing drivers for these communication interfaces.

Another insight on which aspects of the invention are based is that the solution can be very cost effective if it is possible to re-use a device, such as for example a mobile phone, that the user already has anyway rather than having to distribute new dedicated hardware devices.

Authentication Devices

In some embodiments of the invention each user of a plurality of users is provided with an authentication device. In some embodiments the authentication device is a dedicated hardware device such as a dedicated strong authentication token. In other embodiments the authentication device comprises a hand-held mobile electronic customer device, such as for example a smartphone or a personal digital assistant (PDA). In some embodiments the hand-held mobile electronic customer device is equipped with an authentication software application. In some embodiments the authentication device has been personalized with at least one secret value that the authentication device may use, directly or indirectly, in the generation of dynamic security values as explained below.

Generation of Dynamic Security Values.

In some embodiments the authentication device is adapted to generate dynamic security values. In some embodiments the generated dynamic security values may comprise one-time or dynamic passwords, and/or responses to challenges and/or electronic signatures on transaction data. In some embodiments the authentication device is adapted to present generated dynamic security values to the user. In some embodiments the dynamic security values are generated by cryptographically combining at least one secret value (such as a cryptographic key) with at least one dynamic variable (such as a time value and/or a counter value and/or a challenge and/or transaction related data or any combination of these). In some embodiments the cryptographically combining comprises performing a cryptographic algorithm. In some embodiments the cryptographic algorithm may comprise a symmetric encryption or decryption algorithm such as DES, 3DES or AES. In some embodiments the cryptographic algorithm may comprise a hashing or keyed hashing algorithm such as SHA-1.

In some embodiments the authentication device may also use an application identifying data element, for example an Application Identifier, when generating a dynamic security value. In some embodiments the authentication device cryptographically combines the Application Identifier with the at least one secret value and possibly other data such as the at least one dynamic variable to generate a dynamic security value.

PIN Handling.

In some embodiments the authentication device is adapted to receive a PIN or password value provided by the user. In some embodiments the authentication device is adapted to pass on a PIN or password value provided by the user to a second security device (such as a smart card) for verification. In some embodiments the authentication device is adapted to remove from its memory any copy in any format of such a PIN value once that PIN value has been verified. In some embodiments the authentication device has been adapted to actively erase or overwrite the memory locations where such a PIN value has been temporarily stored after the PIN value has been verified. In some embodiments the authentication device stores a reference value that is mathematically related to a correct value for the PIN or password that is expected to be provided by the user and the authentication device is adapted to compare a PIN or password value provided by a user to that reference value. In some embodiments the authentication device is adapted to generate the secret value using a PIN or password value provided by the user. In some embodiments the authentication device stores a value that comprises the secret value that is encrypted with an encryption key that is derived from a PIN or password value provided by the user and the authentication device is adapted to derive an encryption key value from a PIN or password value provided by the user and use that encryption key value to decrypt the encrypted secret value which may then be used e.g. to generate a dynamic security value.

Communication Interfaces

In some embodiments the authentication device may be networked. In some embodiments the authentication device may comprise a data communication interface to exchange data over a computer network. In some embodiments the communication interface may comprise a wireless communication interface e.g. to communicate with a mobile phone network. In some embodiments the authentication device may be adapted to send and/or receive authentication related data to a server over a computer network. In some embodiments the authentication device is adapted to communicate data over the internet. In some embodiments the authentication device comprises a TCP/IP (Transmission Control Protocol/Internet Protocol) stack. In some embodiments the authentication device is adapted to exchange data over an SSL (Secure Sockets Layer) and/or TLS (Transport Layer Security) connection. In some embodiments the authentication device is adapted to send and/or receive HTTP (HyperText Transfer Protocol) and/or HTTPS (HyperText Transfer Protocol Secure) messages Authentication Initiating Message In some embodiments the authentication device may be adapted to receive an Authentication Initiating Message. In one embodiment of the invention the Authentication Initiating Message can include a challenge (e.g., a random number or hash of transaction data that may be processed for authentication/validation purposes). In another embodiment of the invention the Authentication Initiating Message includes transaction related data including transaction values or transaction context information. In some embodiments the transaction context information may include transaction data labels and/or information regarding the meaning of the transaction related data. In some embodiments the Authentication Initiating Message includes application flow related information. In some embodiments the application flow related information may include information regarding the type of transaction. In some embodiments the application flow related information may guide the authentication device with respect to the way that the authentication device should handle the received transaction related data and/or how the authentication device should handle the user interaction flow, for example which data should be presented to the user for review and/or approval and whether the user should be asked or given the opportunity to correct data or manually provide extra data and/or which messages should be presented to the user.

In some embodiments the authentication device may comprise optical components for receiving optical information. In some embodiments the Authentication Initiating Message may be encoded as an optical signal emitted by the user's access device (e.g. as a dynamic or static pattern visualised on the access device's display) and received and decoded by the user's authentication device. In some embodiments the authentication device may comprise a camera and the Authentication Initiating Message may be encoded as one or more pictures or images displayed on the access device's display and captured by the authentication device's camera. In some embodiments the Authentication Initiating Message may be encoded as a QR Code (Quick Response Code) that the authentication device reads with its camera and decodes to obtain the actual Authentication Initiating Message. In some embodiments the Authentication Initiating Message may be encoded using more than one QR Code. In some embodiments the Authentication Initiating Message may comprise or take the form of a URL.

Server Credential

In some embodiments the Authentication Initiating Message may include a server credential that has been cryptographically generated by a server (which may be for example an application server or the authentication server). In some embodiments the server has generated the server credential using a symmetric cryptographic and a secret key that is shared with the authentication device or a second security device that the authentication device communicates with. In some embodiments the authentication device is adapted to verify the server credential. In some embodiments the authentication device is adapted to verify the server credential in cooperation with a second security device. In some embodiments the verification of the server credential is done using a symmetric cryptographic algorithm that uses a secret key shared with the server. In some embodiments the server credential comprises a server one-time password. In some embodiments the server credential comprises a data signature. In some embodiments the server credential comprises a Message Authentication Code (MAC). In some embodiments the server credential comprises encrypted input data. In some embodiments the purpose of the server credential is to authenticate a server or server application. In some embodiments the purpose of the server credential is to authenticate input data (which may be comprised in the Authentication Initiating Message) received by the authentication device from a server. In some embodiments the purpose of the server credential is to protect the integrity of input data (which may be comprised in the Authentication Initiating Message) received by the authentication device from a server. In some embodiments the purpose of the server credential is to protect the confidentiality of input data (which may be comprised in the Authentication Initiating Message) received by the authentication device from a server. In some embodiments the purpose of the server credential is to cryptographically link together input data (which may be comprised in the Authentication Initiating Message) received by the authentication device from a server. In some embodiments the generation of dynamic security values by the authentication device may be conditional on successful verification of the server credential.

Authentication Session Identifier

In some embodiments the Authentication Initiating Message may include a data element for identifying the authentication session, for example an Authentication Session Identifier. In some embodiments such an Authentication Session Identifier, or shortly Session ID, may comprise a sequence number. In some embodiments the Session ID may comprise a randomly generated number. In some embodiments the Session ID may be generated by an application server. In some embodiments the Session ID may be generated by an authentication server. In some embodiment the Session ID may be used by an Authentication Device that receives the Authentication Initiating Message in the generation of a Dynamic Security Value.

Application Identifier

In some embodiments the Authentication Initiating Message may include a data element for identifying an application or application provider, e.g. an Application Identifier. In some embodiments the Application Identifier may identify the application or application provider for which the user's authentication device is supposed to generate a dynamic security value. In some embodiments the authentication device is adapted to use a value related to an Application Identifier comprised in an Authentication Initiating Message in the calculation of a dynamic security value. In some embodiments the Application Identifier comprises a representation of the application or application provider that the user can recognise as identifying the application or application provider and the authentication device is adapted to present that representation to the user. In some embodiments the Application Identifier comprises a digital data element and the authentication device is adapted to use that digital data element to retrieve a representation of the application of application provider that the user can recognise as identifying the application or application provider and the authentication device is adapted to present that representation to the user. In some embodiments the representation may comprise a name or a logo. In some embodiments the representation may comprise sounds (e.g. a speech rendering of a name that the user may use to identify the application or application provider, or a musical identification tune that the user may associate with the application or application provider). In some embodiments the authentication device may present the representation by visualising visual data on a display. In some embodiments the authentication device may present the representation to the user by emitting audio sounds, which may comprise for example speech or music.

In some embodiments the authentication device is adapted to generate a dynamic security value upon receiving an Authentication Initiating Message. The authentication device may further be adapted to extract an Application Identifier from the Authentication Initiating Message and to present the corresponding application or application provider representation to the user and to capture the user's approval whether to generate a dynamic security value for that application or application provider and to generate the dynamic security value on condition that the user approved to do so.

Destination Address

In some embodiments the Authentication Initiating Message may include a Destination Address. In some embodiments the Destination Address may comprise a network address of a server to which the authentication device may send data or one or more messages. In some embodiments this may be the network address of an application server. In some embodiments this may be the network address of an authentication server. In some embodiments the Destination Address may comprise an IP address. In some embodiments the Destination Address may comprise a domain name. In some embodiments the Destination Address may comprise a URL (Uniform Resource Locator) or URI (Uniform Resource Identifier). In some embodiments the Destination Address may comprise a destination address of a server where the authentication device may send a generated dynamic security value to.

Response Message

In some embodiments the authentication device is adapted to generate a Response Message after a dynamic security value has been generated. In some embodiments the Response Message may comprise the dynamic security value. In some embodiments the Response Message may comprise a data element identifying the application or application provider for which the dynamic security value has been generated. This data element identifying the application or application provider may for example comprise the Application Identifier comprised in the Authentication Initiating Message received by the authentication device. In some embodiments the Response Message may comprise a data element identifying the authentication device (e.g. a serial number). In some embodiments the Response Message may comprise a data element identifying the user e.g. a user name or a user ID (user identifier). In some embodiments the Response Message may comprise a data element identifying the session for which the dynamic security value is generated. This may for example comprise a Session Id comprised in the Authentication Initiating Message received by the authentication device.

In some embodiments the authentication device may be adapted to send the Response Message to a server over a computer network. In some embodiments the authentication device may be adapted to send the Response Message to a server over the internet. In some embodiments the authentication device may be adapted to send the Response Message to a server in an IP message. In some embodiments the authentication device may be adapted to send the Response Message to a server in a HTTP message, for example a HTTP POST message. In some embodiments the authentication device may send the Response Message to the application server. In some embodiments the authentication device may send the Response Message to an authentication server. In some embodiments the destination address of the server to which the authentication device needs to send the Response Message may be stored in the authentication device. In some embodiments the authentication device uses an application identifying data element (such as for example an Application Identifier comprised in the Authentication Initiating Message received by the authentication device) to retrieve the destination address for the Response Message. In some embodiments the authentication device uses a Destination Address comprised in the Authentication Initiating Message received by the authentication device to retrieve the destination address for the Response Message. In some embodiments that authentication device applies a filter when retrieving the destination address. In some embodiments the authentication device maintains a white-list of allowed destination addresses and compares the retrieved destination address with that white-list and declines sending the Response Message if the retrieved destination address doesn't match that white-list. For example in some embodiments the Authentication Initiating Message comprises the domain name of the server to send the Response Message to and the authentication device compares that domain name to a list of allowed domain names.

Authentication Server.

In some embodiments the secret keys of the authentication devices are shared with an authentication server. In some embodiments the authentication server may comprise one or more server computers running one or more software applications. In some embodiments the authentication server comprises a database that stores the values of the secret keys (or equivalent values) of the authentication devices. In some embodiments the authentication server stores one or more secrets that the In some embodiments a secret value that is stored in the database is linked to an identification value (such as a serial number) of the corresponding authentication device or it is linked to an identification value (such as a user name) of a user associated with the corresponding authentication device. In some embodiments the authentication server stores a master secret and is adapted to regenerate or derive the secret value of an authentication device using the master secret and an identification value of the authentication device or a user associated with the authentication device. In some embodiments the authentication server is adapted to verify dynamic security values generated by the authentication devices. In some embodiments the authentication server uses a secret value (which it may retrieve from storage or regenerate as explained above) associated with the authentication device to verify a dynamic security value that is presumed to have been generated with that authentication device.

In some embodiments the authentication server may comprise one or more databases for storing data. In some embodiments the authentication server may use and/or store user related data. In some embodiments the authentication server may use and/or store data related to the authentication device. In some embodiments the data related to the user or the authentication device comprise one or more secret keys. In some embodiments one or more of these secret keys may be shared with the user's authentication device.

Yet another aspect of the invention comprises a method to secure a remote server-based application being accessed by a user through an access device, which comprises a computing device such as the user's PC or laptop, communicating with the application server over a computer network e.g. the internet. The method may comprise the following steps.

Making available to a user an authentication device as discussed above. In some embodiments this comprises distributing authentication devices that comprise a dedicated hardware authentication token. In some embodiments this comprises making available an authentication software application for download and installation on a hand-held mobile electronic customer device, such as for example a smartphone or a personal digital assistant (PDA). In some embodiments this furthermore comprises personalizing the authentication device with personalization data. In some embodiments the personalization data may comprise a secret value. In some embodiments the personalization data may comprise an authentication device identification value such as for example a serial number. In some embodiments the personalizing comprises loading personalization data into a hardware strong authentication token prior to the token being distributed to a user. In some embodiments the personalizing comprises the authentication device exchanging personalization messages with a personalization server.

Registering an authentication device and/or user with an authentication server.

Enabling an application for one or more users.

Assembling an Authentication Initiating Message to be transmitted to said authentication device.

In some embodiments the Authentication Initiating Message is assembled by the authentication server. In some embodiments the Authentication Initiating Message is assembled by the application server. In some embodiments the Authentication Initiating Message is assembled partly by the authentication server and partly by the application server. The Authentication Initiating Message may comprise for example a session identifier, and/or a challenge, and/or transaction related data, and/or transaction context related data, and/or an application identifier. In some embodiments the Authentication Initiating Message may comprise a server credential. To obtain the server credential a server may optionally first generate a server credential. In some embodiments this server may be the application server. In some embodiments this server may be the authentication server. The server may generate the server credential using a secret key and a cryptographic algorithm. The cryptographic algorithm may be a symmetric cryptographic algorithm. In some embodiments the secret key for generating the server credential may be shared with the user's authentication token.

Transmitting the Authentication Initiating Message to the user's authentication device.

In some embodiments this comprises sending the Authentication Initiating Message first to the user's access device. The user's access device may be running a computer application such as a web browser. The Authentication Initiating Message may be embedded in one or more web pages that the server-based application serves to the computing device's browser. Then the authentication device may obtain the Authentication Initiating Message from the user's access device. In some embodiments the user's access device's display emits an optical signal encoding Authentication Initiating Message which is received and decoded by the authentication device.

In some embodiments the user's access device displays a QR Code encoding the Authentication Initiating Message (which may be in the form of a URL) and the user's authentication device reads and decodes this QR Code. For example the user's authentication device may comprise a smart phone with a suitable authentication application. The user starts the authentication application which uses the smartphone's camera to read the QR Code and then decodes the QR Code.

In some embodiments the authentication device receives the Authentication Initiating Message in a multi-step process. For example, the authentication device may receive a first message which contains information (such as a URL) that allows the authentication device to contact a server and request the actual Authentication Initiating Message. For example, the application server's web page displayed on the user's access device may display a QR Code encoding a URL pointing to the actual Authentication Initiating Message which may for example be located on the authentication server.

Getting approval from the user.

In some embodiments the authentication device may be adapted to seek approval of the user prior to generating a dynamic security value and/or prior to sending a Response Message comprising a generated dynamic security value. In some embodiments this seeking the user's approval comprises the authentication device presenting to the user a representation of the application or application provider. This representation may be obtained and presented as explained above. In some embodiments this seeking the user's approval comprises the authentication device presenting to the user data comprised in the Authentication Initiating Message. In some embodiments this may comprise presenting transaction related data to the user. In some embodiments the user may indicate his or her approval by using an OK button. In some embodiments the user may indicate his or her approval by entering a valid PIN or password. In some embodiments the authentication device doesn't generate a dynamic security value if the user hasn't indicated his or her approval. In some embodiments the authentication device doesn't send a Response Message comprising a dynamic security value to a server if the user hasn't indicated his or her approval.

Generating a dynamic security value.

The authentication device may generate the dynamic security value as described in the preceding paragraphs. In some embodiments the authentication token processes the Authentication Initiating Message to generate a dynamic security value. In some embodiments the dynamic security value is generated by cryptographically combining a dynamic variable with a secret key. In some embodiments the cryptographically combining comprises using a symmetric cryptographic algorithm. In some embodiments the dynamic variable comprises a challenge. In some embodiments the dynamic variable comprises transaction related data. In some embodiments the dynamic variable comprises a time related value. In some embodiments the dynamic variable comprises a counter. In some embodiments the dynamic variable comprises a data element comprised in the Authentication Initiating Message received from the server-based application. In some embodiments the dynamic security value is generated using a key that is shared with the server-based application. In some embodiments the input data comprises a server credential and the authentication device verifies the server credential prior to generating the dynamic security value. In some embodiments the authentication device uses a symmetric cryptographic algorithm with a secret key that is shared with the application server to verify the server credential. In some embodiments the authentication device generates the dynamic security value on condition that verification of the server credential was successful.

In some embodiments the authentication device may generate the dynamic security value using a cryptographic algorithm that also uses as input a data element identifying the application or application provider. In some embodiments this data element may comprise the Application Identifier comprised in the Authentication Initiating Message.

transmitting the generated dynamic security value to the authentication server.

In some embodiments the authentication token comprises a secure user output interface and uses that secure user output interface to output the dynamic security value to the user. In some embodiments the user receives the dynamic security value and enters the dynamic security value on a web page related to the server-based application.

In some embodiments the authentication device assembles a Response Message comprising the dynamic security value and sends it to the authentication server. In some embodiments the authentication device assembles a Response Message comprising the dynamic security value and sends it to the application server and the application server forwards the Response Message, or some part of it, to the authentication server. In some embodiments the Response Message may comprise other data elements such as a session identifier, an application identifier, an authentication device identifier, a user identifying data element and/or other data that may have been approved by the user and/or may have been used in the generation of the dynamic security value such as a challenge or transaction data or time or counter synchronisation data.

Verifying the received dynamic security value. In some embodiments the authentication server may verify the validity of the received dynamic security value. The authentication server may verify the received dynamic security value using a cryptographic algorithm. In some embodiments the authentication server cryptographically combines a reference dynamic variable with a reference secret key to verify the received dynamic security value. In some embodiments the authentication server generates a reference security value and compares the reference security value with the received dynamic security value. In some embodiments the authentication server computes the reference security value by cryptographically combining a reference dynamic variable with a reference secret key. In some embodiments the cryptographically combining comprises performing a symmetric cryptographic algorithm. In some embodiments the secret key comprises a secret key that the authentication server shares with the authentication device or with a removable second security device the user's authentication device has cooperated with to generate the dynamic security value.

verification of the application provider

In some embodiments the authentication device presents the user an application identifier. In some embodiments the authentication server verifies whether the application server that requested verification of the dynamic security value matches the application identifier that was presented to the user. In some embodiments the authentication device includes the application identifier that was presented to the user in the Response Message and the authentication server verifies whether the application identifier in the Response Message that it received matches the application server that requested verification of the dynamic security value.

In some embodiments the authentication device presents the user an application identifier and uses that application identifier in the generation of the dynamic security value. In some embodiments the server uses a reference application provider identifier in the verification of the dynamic security value such that this verification will fail if the application identifier used by the authentication device in the generation of the dynamic security value doesn't match the reference application provider identifier used by the authentication server. In some embodiments the authentication server extracts the reference application provider identifier from the Response Message that also contains the dynamic security value to be verified. In some embodiments the authentication server deduces the reference application provider identifier value from the identity of the application server on behalf of which the server verifies the dynamic security value.

Informing the application server about the verification result.

In some embodiments, upon verifying the validity of the dynamic security value, the authentication server may inform the application server about the result of the verification. This informing may comprise informing whether the verification was successful. This informing may comprise, in case the verification failed, an error code (e.g. "cryptographic verification failed", "unknown authentication device", "unknown session id", "user account expired", "application provider account expired", . . . ).

informing the application server about the user identity.

In some embodiments the authentication server may also pass the application server an indication of the identity of the user. In some embodiments the authentication server may pass the application server a general user name that is independent of the application or application provider. In some embodiments the authentication server may pass the application server a specific user name that is a function of the user and of the application or application provider. In some embodiments the authentication server maintains a database that contains for each pair of registered users and enabled applications a user id to pass to the application server at each authentication session.

Informing the user about the verification result.

In some embodiments the server receiving the Response Message returns a acknowledgement message to the authentication device comprising the result of the verification of the dynamic security value. This message may, in case of failure, contain an error code (e.g. "cryptographic verification failed", "unknown authentication device", "unknown session id", "user account expired", "application provider account expired", . . . ).

Taking appropriate action depending on the outcome of the verification of the dynamic security value. In some embodiments this may comprise that the user is granted access to the application server's application in case the verification was successful and is refused access in case the verification was not successful. In some embodiments this may comprise that a transaction request submitted by the user is performed if the verification was successful and is not performed if the verification was not successful.

In some embodiments the application server may comprise one or more server computers running one or more software applications. In some embodiments the application server may host one or more applications to be remotely accessed by one or more users. In some embodiments the application server may comprise one or more web servers. In some embodiments one or more applications hosted by the application server may be web-based.

In some embodiments the user's access device to access the application hosted by the application server may comprise a computing device. In some embodiments this computing device may comprise a PC or a laptop. In some embodiments this computing device may comprise an Internet access device, for example in a public Internet access point. In some embodiments the access device may be networked. In some embodiments the access device may be adapted to communicate with an application server over a computer network. In some embodiments this computer network may comprise a public telecommunications network. In some embodiments this computer network may comprise the internet.

BRIEF DESCRIPTION OF THE DRAWINGS

The foregoing and other features and advantages of the invention will be apparent from the following, more particular description of embodiments of the invention, as illustrated in the accompanying drawings.

DETAILED DESCRIPTION

Some implementations of the present invention are discussed below. While specific implementations are discussed, it should be understood that this is done for illustration purposes only. A person skilled in the relevant art will recognize that other components and configurations may be used without parting from the spirit and scope of the invention.

Figure 1:
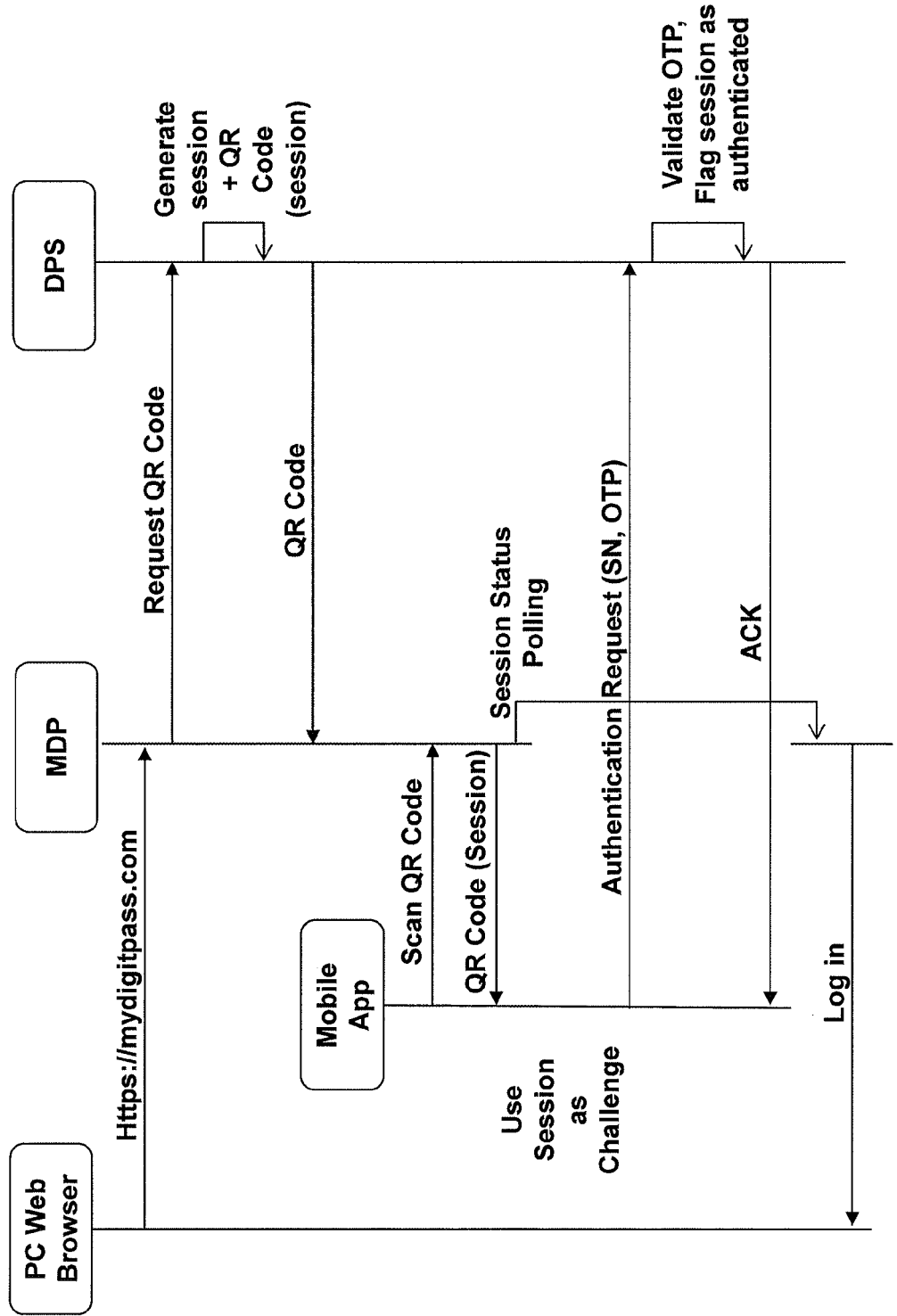
FIG. 1 schematically illustrates an exemplary implementation of the invention.

FIG. 1 illustrates an exemplary implementation of the invention.

A user accesses a remote application (indicated as 'MDP' on the figure) using an access device (indicated as 'PC Web Browser' on the figure). The access device may for example be a PC or a laptop. The remote application may be hosted by an application server. The user's access device may communicate with the application server over a computer network such as for example the internet. The application may be web based and the user may access the web based application using a web browser that runs on the user's access device.

At some point the user may explicitly or implicitly request access to an access-protected part of the application (indicated by the arrow that is labelled as 'https://mydigipass.com' on the figure).

The application may obtain an Authentication Initiating Message. The application may obtain the Authentication Initiating Message by sending a request (indicated by the arrow labelled as 'Request QR Code' on the figure) to an Authentication Server (indicated as 'DPS' on the figure). The Authentication Server may respond to this request by returning to the application part or all of the contents of the Authentication Initiating Message. For example the Authentication Server may send the application a message containing a domain name. The message may also comprise a session ID. The message may also comprise a challenge. The application may send a web page to the web browser on the access device containing a representation of the Authentication Initiating Message. For example the web page may comprise a QR Code. The QR Code may encode a URL or URI. That URL/URI may comprise the data comprised in the Authentication Initiating Message such as a domain name and/or a session ID and/or a challenge. The web page may suggest the user to read the QR Code with his or her authentication device.

The user's authentication device (indicated by 'Mobile App' on the figure) may for example be a smartphone comprising a photo camera and equipped with an authentication application. In other embodiments it may comprise a dedicated hardware token. The user may start the authentication applet or application on the authentication device and instruct the authentication applet or application to obtain the representation of the Authentication Initiating Message presented by the access device. For example the user may make the authentication device to read the QR Code on the display of the user's access device. Upon obtaining the representation of the Authentication Initiating Message presented by the access device, e.g. by reading the QR Code (indicated by the arrows labelled 'Scan QR Code' and 'QR Code (Session)' on the figure), the authentication applet decodes the QR Code to obtain the contents of the Authentication Initiating Message. These contents may for example comprise a domain name, and/or a session ID, and/or a challenge.

In some embodiments the authentication applet may then generate a dynamic security value without further user interaction. In other embodiments the authentication applet may ask the user for explicit approval before proceeding. The authentication applet may generate a one-time password (indicated on the figure as 'Use Session as Challenge') by cryptographically combining secret that it stores with one or more dynamic variables. The one or more dynamic variables may comprise the value of the challenge extracted from the Authentication Initiating Message, and/or the value of the time maintained by a clock on the authentication device, and/or the value of a counter maintained by the authentication applet (whereby the authentication applet may for example increment the counter each time it generates an OTP). The authentication applet may for example generate a cryptographic hash of a combination of the one or more dynamic variables and the secret using a cryptographic hashing algorithm such as SHA-1. The authentication applet may for example encrypt a combination of the dynamic variables using an encryption algorithm parameterized by the secret.

The authentication device may assemble a Response Message. This Response Message may comprise the generated OTP. It may also comprise the session ID extracted from the Authentication Initiating Message. It may also comprise an identifier of the authentication device such as for example a unique serial number stored by the authentication applet. The authentication device may send this Response Message to a server indicated by the domain name extracted from the Authentication Initiating Message. The domain name may for example indicate the authentication server. Prior to sending the Response Message the authentication applet may verify whether the domain name indicates an allowed destination for the Response Message. The authentication device may for example compare the domain name to a list of allowed domain names or to a list of allowed domain name patters.

The authentication device may send the Response Message e.g. to the authentication server (indicated by the arrow labelled as 'Authentication Request (SN, OTP)'). The Response Message may for example comprise a HTTP POST message. This HTTP POST message may be sent to the server indicated in the URL that was encoded by the QR Code.

Upon receiving the Response Message the authentication server may validate the OTP comprised in the Response Message. To verify the OTP the authentication server may use a verification secret. The authentication server may obtain the verification secret by using a authentication device identifier (e.g. a serial number) comprised in the Response Message. For example the authentication server may use the authentication device identifier to look up the verification secret in a database, or the authentication server may derive the verification secret from the authentication device identifier and a master secret.

After validating the OTP the authentication server may inform the authentication device of the outcome (indicated by the arrow labelled as 'ACK' in the figure).

After validating the OTP the authentication server may inform the application server of the outcome of the verification. For example the application server may be polling the authentication server for the outcome of the validation of the OTP associated with the session ID comprised in the Authentication Initiating Message.

The authentication server may also pass a user identifier (such as a user name) to the application server. To obtain the user identifier the authentication server may search a database using the authentication device identifier that may be comprised in the Response Message. In some embodiments the database may comprise more than one user identifier for the same user associated with a given authentication device. For example the authentication serve may store a different user identifier for different application servers and pass the corresponding user identifier to the application server. In some embodiments the authentication serve may store more than one user identifier for the same user and the same application and the authentication server may engage in a dialogue with the authentication device to allow the user to choose the correct user identifier to pass to the application server.

A System for Securing Remote Applications.

Figure 2:
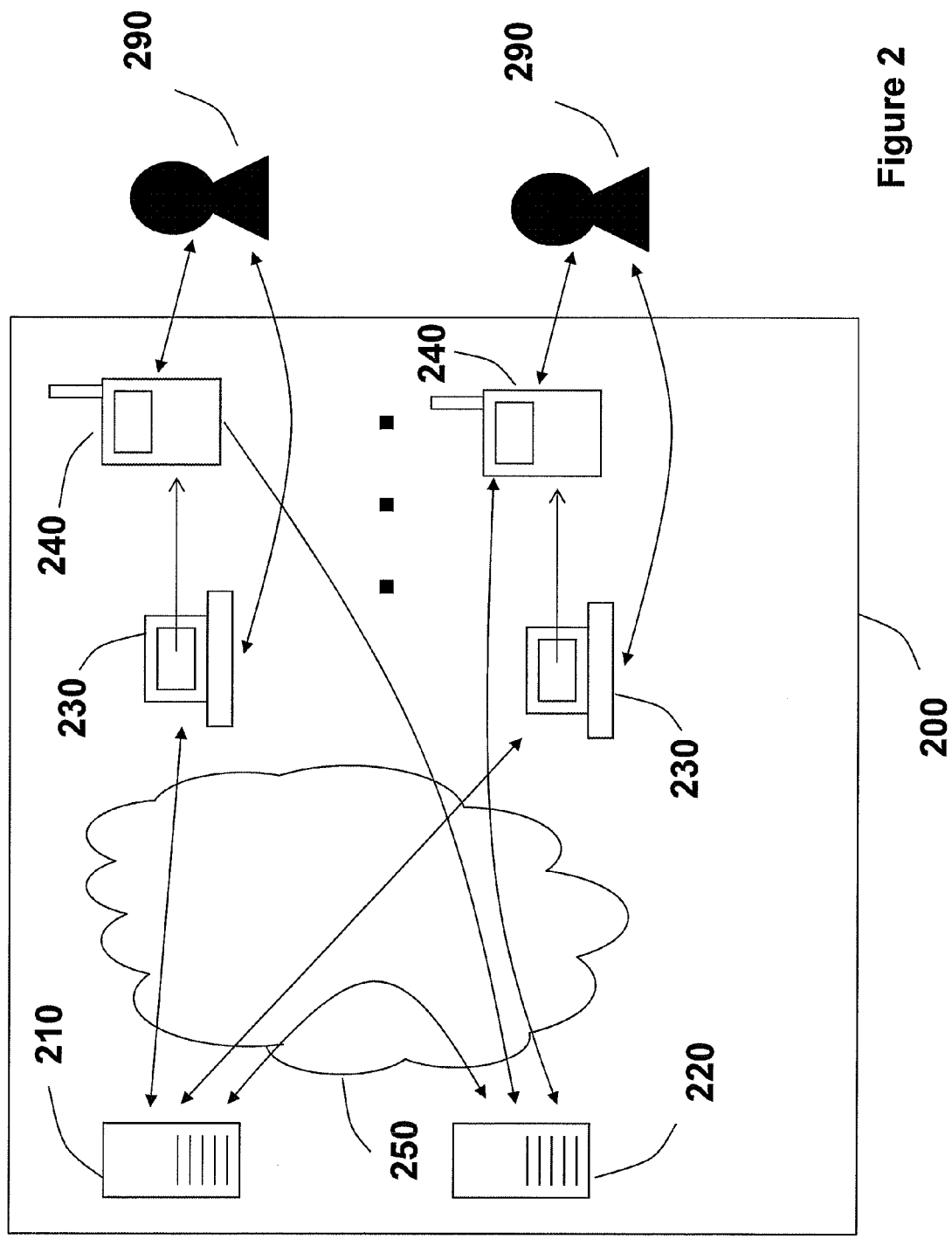
FIG. 2 schematically illustrates an example of a system according to an aspect of the invention.

FIG. 2 schematically illustrates an example of a system according to an aspect of the invention.

The system (200) comprises the following components: an application server (210), an authentication server (220), a plurality of access devices (230), and a plurality of user authentication devices (240). In some embodiments there may be more than one application servers.

The application server (210) may be adapted to host one or more remotely accessible applications. It may for example host a web server. The application server may comprise a server computer. The application server may comprise a data processing component such as for example one or more microprocessors. It may comprise storage components for storing data and/or software. These storage components may comprise volatile and/or non-volatile memory such as RAM and/or hard disks. The application server may comprise a data communication interface (such as for example an Ethernet card) to connect the application server to a computer network (250) (such as for example the internet) so that the application server can communicate and exchange data and messages with for example the authentication server and/or an access device and/or a user authentication device.

Examples of remotely accessible applications that may be hosted by an application server may include: internet banking applications, e-commerce sites, web-mail applications (such as Gmail), social networking sites (such as Facebook), and other web-based, internet-based or cloud-based applications.

The authentication server (220) may host an authentication server application which may be adapted to verify dynamic security values such as for examples one-time passwords or transaction signatures which may have been generated by a user authentication device. In some embodiments the authentication server may act as a trusted party verifying dynamic security values on behalf of possibly more than one application servers that may be under control of different, unrelated application providers. The authentication server may be adapted to carry out cryptographic calculations which in some embodiments may involve symmetric and/or asymmetric cryptographic algorithms. The authentication server may comprise secure hardware such as for example a HSM (hardware security module) to securely perform certain security sensitive operations or calculations that may involve secret keys. The authentication server may comprise a server computer. The authentication server may comprise a data processing component such as for example one or more microprocessors. It may comprise storage components for storing data and/or software. These storage components may comprise volatile and/or non-volatile memory such as RAM (Random Access Memory) and/or hard disks.

In some embodiments the storage components may comprise a data base. In some embodiments the storage components may be used to store user related data for each of a plurality of users. In some embodiments these user related data may comprise for example one or more user related secret keys or user profile data which in some embodiments may be application specific. In some embodiments these user related data may comprise user authentication device identification data (such as a serial number) of one or more user authentication devices that for example may be associated with the user.

In some embodiments the storage components may be used to store user authentication device related data for each of a plurality of user authentication devices. In some embodiments these user authentication device related data may comprise for example one or more user authentication device related secret keys or user authentication device configuration data which in some embodiments may be application and/or user specific. In some embodiments these user authentication device related data may comprise user identification data (such as a user name or user ID) of one or more users that for example may be associated with the user authentication device.

The authentication server may comprise a communication interface (such as for example an Ethernet card) to connect the authentication server to a computer network (such as for example the Internet) so that the authentication server can communicate with for example an application server and/or a user authentication device and/or an access device.

In some embodiments a single server may act as both an application server and an authentication server. In other embodiments the application servers and the authentication server are distinct servers that interact remotely by exchanging messages over a computer network (such as for example the internet).

The access device (230) may be an electronic device adapted to connect to an application server and to allow a user to interact remotely over a computer network with an application server. The access device may comprise a data processing component such as for example one or more microprocessors. It may comprise storage components for storing data and/or software. These storage components may comprise volatile and/or non-volatile memory such as RAM and/or hard disks and/or solid state drives (SSD). The access device may comprise a communication interface (such as for example an Ethernet card) to connect the access device to a computer network (such as for example the internet) so that the access device can communicate with for example an application server and/or an authentication server. The access device may comprise a user interface with a user input interface and a user output interface to interact with a user (290). The access device may for example comprise a display and/or speakers to present output to the user and may for example comprise a keyboard and/or a touch screen and/or a mouse to receive input from a user.

The access device may for example comprise a computing device such as a Personal Computer (PC), or a laptop, or a tablet computer. The access device may be provided with a computer program to allow the user to interact with a remote application over a computer network such as the internet. This computer program may for example comprise a web browser (such as for example Internet Explorer or Mozilla Firefox) and the remote application may for example comprise a web-based server application. The access device may interact with an application hosted by an application server by exchanging data and messages. The access device may interact with an application hosted by an application server by using a communication protocol such as for example IP (Internet Protocol) and/or SSL/TLS (Secure Sockets Layer/Transport Layer Security) to exchange messages such as HTTP (Hypertext Transfer Protocol) messages.

In some embodiments the access device may be adapted to receive from an application server data related to an Authentication Initiating Message that enable the access device to obtain or generate a representation of the Authentication Initiating Message. For example, in some embodiments the access device is adapted to receive from an application server a representation of the Authentication Initiating Message. For example the access device may be adapted to receive a web page containing an image (for example a two-dimensional bar code such as a QR-code) or an audio file encoding the Authentication Initiating Message. In some embodiments the access device is adapted to receive from an application server one or more data elements (such as for example a challenge and/or transaction data and/or an application identifier) that are comprised in the Authentication Initiating Message and that the access device uses to generate a representation of the Authentication Initiating Message. For example the access device may be adapted to receive a web page containing data elements to be comprised in the Authentication Initiating Message and the access device may execute an application such as for example a browser plug-in or an applet (which may also be contained in the received web page) to generate a representation (such as for example a two-dimensional bar-code) of the Authentication Initiating Message. In some embodiments the access device is adapted to receive from the application server a data element that the access device uses to retrieve from another server (such as for example an authentication server) one or more data elements that are comprised in the Authentication Initiating Message and that the access device uses to generate a representation of the Authentication Initiating Message. For example the access device may be adapted to receive a web page containing a URL (Uniform Resource Locator) or URI (Uniform Resource Identifier) pointing to a data element on some server (such as for example an authentication server) that the access device may use to generate a representation of the Authentication Initiating Message. This data element may for example comprise one or more data elements (such as a challenge) that are comprised in the contents of the Authentication Initiating Message, or it may comprise a representation of the entire Authentication Initiating Message, or it may comprise a server credential that authenticates the origin of the Authentication Initiating Message such as a signature or MAC (Message Authentication Code) over the contents of the Authentication Initiating Message or an encrypted representation of the Authentication Initiating Message.

The access device may be adapted to output a signal that encodes a representation of the Authentication Initiating Message. In some embodiments the access device is adapted to use its user output interface (e.g. its audio speakers or its display) to output the signal that encodes a representation of the Authentication Initiating Message. For example in some embodiments the access device may be adapted to play over its speakers an audio file containing an audio signal encoding a representation of the Authentication Initiating Message. In some embodiments the access device may be adapted to emit an optical signal by displaying a time-varying optical pattern that encodes a representation of the Authentication Initiating Message. In some embodiments the access device may be adapted to display one or more images (such as two-dimensional bar codes) that encode a representation of the Authentication Initiating Message.

The user authentication device (240) will be discussed in more detail in relation to FIGS. 3a and 3b.

In some embodiments the access device and the user authentication device are physically distinct devices. In some embodiments the user authentication device is a trusted entity while the access device is not a trusted entity.

The system is adapted to authenticate users accessing an application hosted by one of the application servers and/or to authenticate transactions submitted by users to an application hosted by one of the application servers and may for example be used with the method discussed in relation to FIG. 4.

Figure 3A:
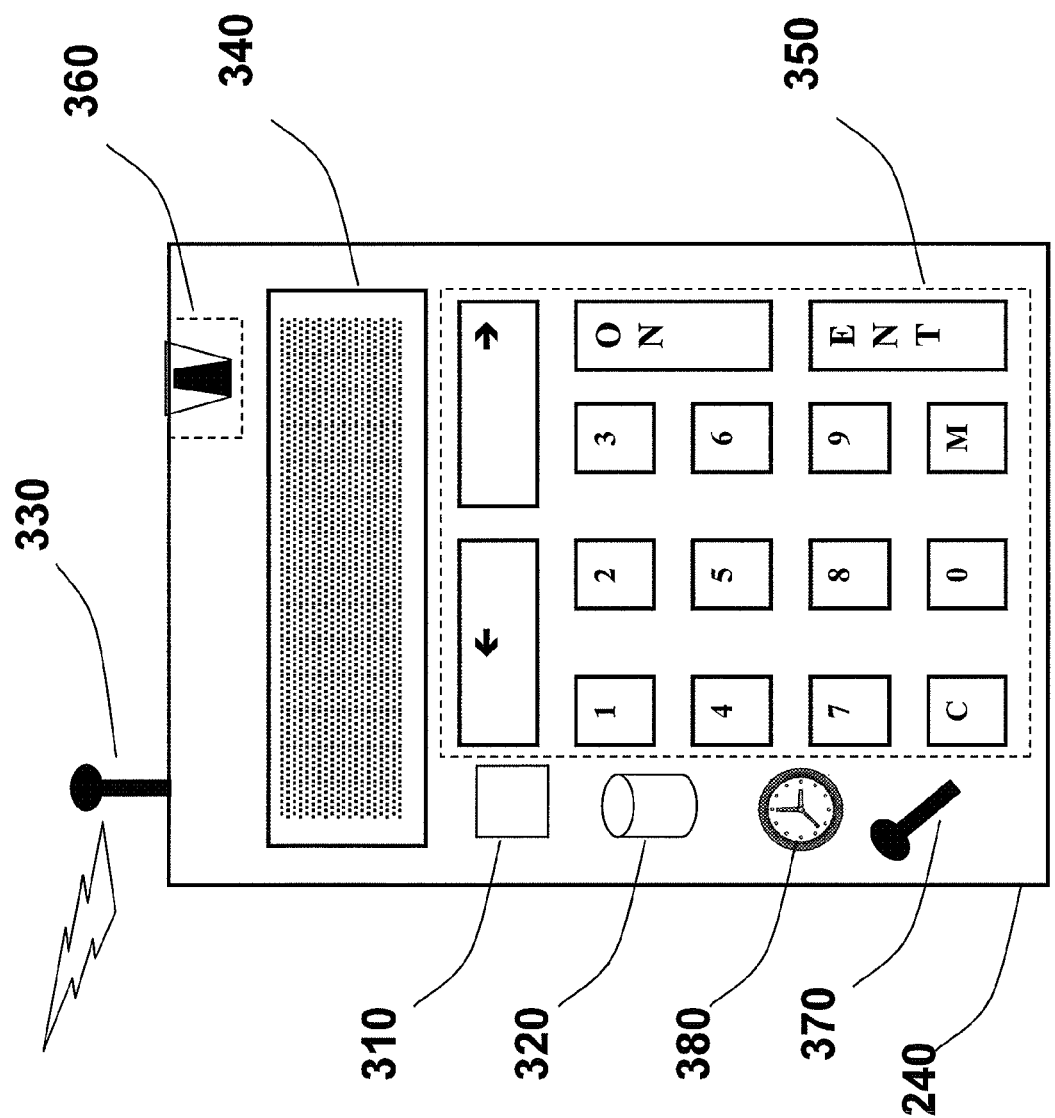
FIGS. 3a and 3b schematically illustrate examples of a user authentication device according to an aspect of the invention.
Figure 3B:
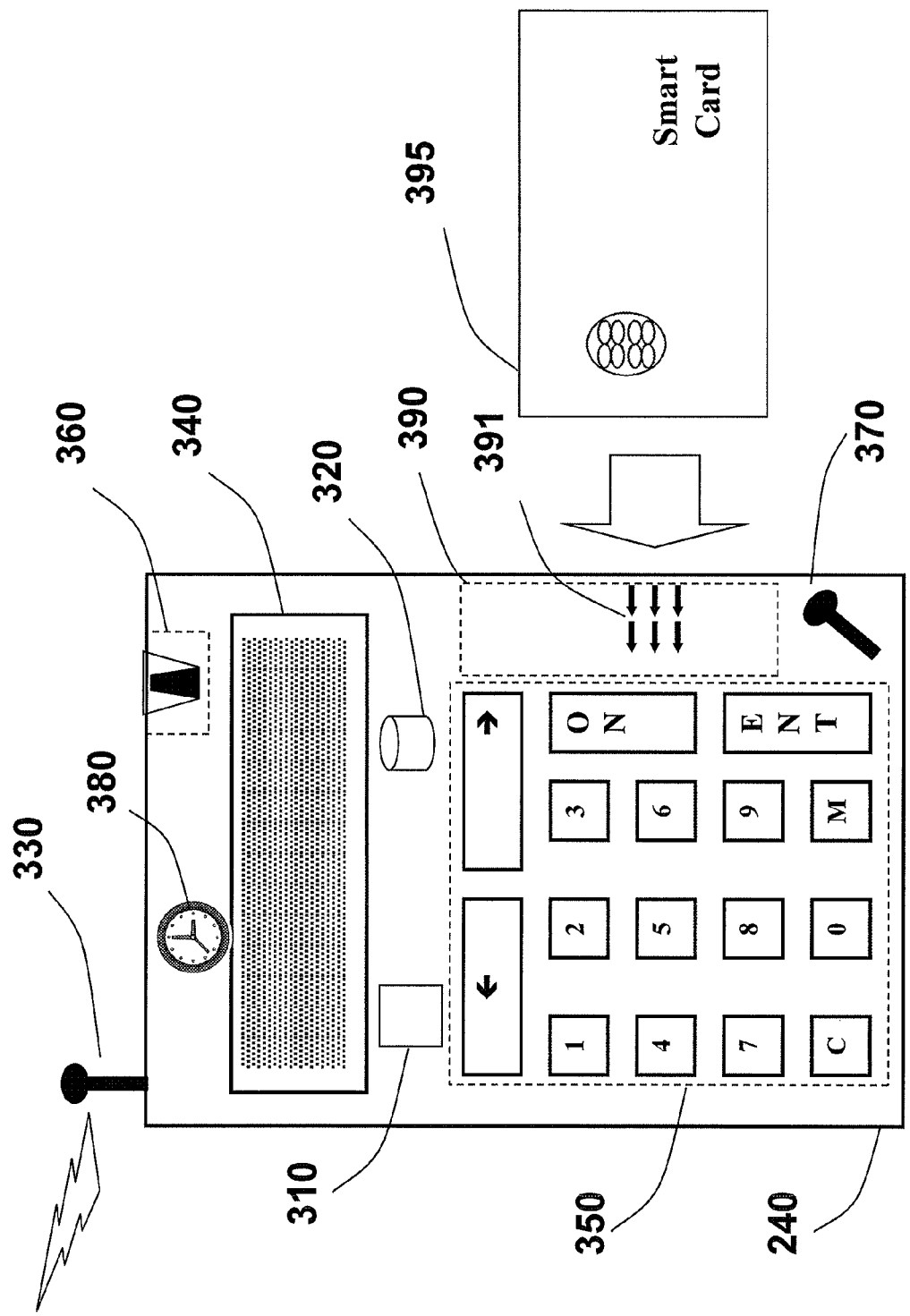

FIGS. 3a and 3b schematically illustrate an example and a variant of that example of an apparatus according to an aspect of the invention. The apparatus comprises an example of a user authentication device (240) of the system discussed in relation to FIG. 2.

The user authentication device (240) comprises an electronic device adapted to generate a Response Message comprising a dynamic security value in response to an Authentication Initiating Message for example for authenticating a user or a transaction. The user authentication device may comprise a data processing component (310), storage components (320) for storing data and/or software, a data communication interface (330) to connect the user authentication device to a computer network, a user interface (340, 350) to interact with a user, an input interface (360, 370) to capture a signal that represents an Authentication Initiating Message that is being output by an access device (e.g. by means of the user output interface of the access device), and a real-time clock (380) for providing time-related values.

The data processing component (310) may comprise for example one or more microprocessors. The data processing component may be adapted to perform an algorithm for generating dynamic security values. The data processing component may be adapted to perform cryptographic operations which may comprise performing symmetric or asymmetric cryptographic algorithms. In some embodiments the data processing component may comprise a microprocessor and/or a controller and/or an ASIC (Application Specific Integrated Circuit).

The user authentication device may comprise storage components (320) for storing data and/or software. These storage components may comprise volatile and/or non-volatile memory such as RAM and/or ROM (Read-Only Memory) and/or Flash and/or hard disks and/or solid state drives (SSD).

The user authentication device may comprise a data communication interface (330) to connect the user authentication device to a computer network (such as for example the internet) so that the user authentication device can communicate with for example an application server and/or an authentication server. The data communication interface may comprise for example a wireless data communication interface (330) to connect to a wireless communication network such as for example a mobile telephone network such as for example a GSM (Global System for Mobile communications) or UMTS (Universal Mobile Telecommunications System) network. In some embodiments the data communication interface may comprise a mobile radio interface and/or a GSM network interface. In some embodiments the data communication interface may comprise an antenna. In some embodiments the wireless data communication interface may be adapted to send data from the user authentication device to a destination server using a public wireless data communication network. In some embodiments the wireless data communication interface may also be adapted to retrieve data from a remote server (such as the application server or the authentication server) using a public wireless data communication network.

The user authentication device may comprise a user interface (340, 350) with a user input interface (350) and a user output interface (340) to interact with a user. The user authentication device may comprise a user output interface for providing output to a user. The user output interface may for example comprise a display (340) and/or speakers to present output to the user. The user authentication device may comprise a user input interface for receiving input from a user. The user input interface may comprise for example a keyboard (350) and/or a touch screen and/or a microphone to receive input from a user. The display may comprise a graphical display. The display may comprise a colour display. The display may for example comprise a LCD (Liquid Crystal Display) display or a TFT (Thin Film Transistor) display or an OLED (Organic Light Emitting Diode) display.

The user authentication device may comprise an input interface (360, 370) to capture a signal that represents an Authentication Initiating Message that is being output by an access device (for example by the user output interface of the access device). For example, in some embodiments the user authentication device may comprise a microphone (370) to capture an audio signal emitted by for example the speakers of an access device and encoded with an Authentication Initiating Message. In some embodiments the user authentication device may comprise optical sensors to capture optical signals emitted by for example the display of an access device and encoded with an Authentication Initiating Message. In some embodiments the user authentication device may comprise a camera (360) to capture one or more images displayed on the display of an access device and encoding an Authentication Initiating Message. In some embodiments these images may comprise a two-dimensional bard code such as a QR-code.

The user authentication device may comprise a timing mechanism such as real-time clock (380) to provide time-related values that the user authentication device may use as input for a cryptographic algorithm to generate a dynamic security value.

The user authentication device may be adapted to obtain the Authentication Initiating Message by decoding the captured signal. For example it may be adapted to decode a modulated audio signal that encodes an Authentication Initiating Message or it may be adapted to decode one or more images (such as QR-codes) that encode an Authentication Initiating Message.

Server Credential Verification.

In some embodiments the Authentication Initiating Message comprises a server credential and the user authentication device may be adapted to verify this credential. In some embodiments the user authentication device is adapted to verify the server credential using a cryptographic algorithm parameterized with a server credential verification key which may be stored in the user authentication device or which the user authentication device may obtain by using a key stored in the user authentication device.

In some embodiments the user authentication device may use an asymmetric cryptographic algorithm to verify server credentials. In some embodiments the server credential comprises a digital signature over at least some data elements of the Authentication Initiating Message and verification of the server credential may comprise verification of this signature. In some embodiments the signature of the server credential has been generated by the private key of a public-private key pair associated with a trusted server such as the authentication server and the user authentication device verifies the signature using the corresponding public key which may be stored in the user authentication device.

In some embodiments the user authentication device may use a symmetric cryptographic algorithm to verify the server credential. In some embodiments the symmetric cryptographic algorithm is parameterized with a symmetric secret server credential key. In some embodiments the server credential comprises an encrypted portion of the Authentication Initiating Message and the user authentication device verifies the server credential by decrypting this encrypted portion and verifying that in the decrypted portion certain expected structural elements are present such as for example certain fixed values for certain data elements (e.g. tags) in the decrypted portion or certain redundancies such as for example the value of a CRC code or certain mandatory consistencies between the values of certain data elements such as the lengths of certain data fields (as indicated by length fields) or restrictions on the permissible range of the values of certain data fields. In some embodiments the server credential comprises a MAC (message authentication code) or a keyed hash over a portion of the Authentication Initiating Message and the user authentication device may compute a reference value for the MAC or the keyed hash and compare the reference value with the received server credential.

In some embodiments the user authentication device may reject the Authentication Initiating Message if the verification of the server credential fails.

In some embodiments the decoded Authentication Initiating Message may be encrypted and the user authentication device may be adapted to decrypt the encrypted Authentication Initiating Message.

Extracting Data from the Authentication Initiating Message.

The user authentication device may be adapted to extract some data elements that are comprised in the Authentication Initiating Message. In some embodiments data elements that are comprised in the Authentication Initiating Message and that may be extracted by the user authentication device may include one or more of: a challenge, transaction related date, an application identity related data element, a session id, a nonce, a server generated dynamic security value.

Indication and Approval of Application Identity.

In some embodiments the user authentication device may be adapted to extract an application identity related data element from the Authentication Initiating Message. The user authentication device may be adapted to use this application identity related data element to obtain or generate a representation of the application identity. This representation of the application identity may be interpretable and recognisable by the user. In some embodiments the application identity related data element is the representation of the application identity. For example the application identity related data element (and the representation of the application identity) may simply be an alphanumerical application name. In some embodiments the application identity related data element may comprise an index that the user authentication device may use to retrieve the representation of the application identity from an internal database. In some embodiments the user authentication device may be adapted to determine the representation of the application identity from the application identity related data element in the Authentication Initiating Message without using any application specific data element (permanently) stored in the user authentication device. In some embodiments the user authentication device may be adapted to determine the representation of the application identity from the application identity related data element in the Authentication Initiating Message and data that the user authentication device retrieves from an external source. In some embodiments the user authentication device may use the application identity related data element to retrieve application specific data from an external source and use the retrieved data to obtain the representation of the application identity. In some embodiments the application identity related data element may comprise a reference, such as for example a URL or URI, that the user authentication device may use to retrieve the representation of the application identity from an external source such as a remote server such as for example the authentication server or an application server. In some embodiments the representation of the application identity may comprise an application name. In some embodiments the representation of the application identity may comprise a graphical image such as an application logo. In some embodiments the representation of the application identity may comprise a characteristic sound sequence. In some embodiments the representation of the application identity may comprise a synthetic speech rendering of an application name.

In some embodiments the representation of the application identity may be interpretable and recognisable by the user and the user authentication device may be adapted to present the representation of the application identity to the user of the user authentication device as part of the process to generate a Response Message in response to the Authentication Initiating Message. For example in some embodiments the user authentication device may display on its display an application name. In some embodiments the user authentication device may display on its display an image representative of the application such as an application logo. In some embodiments the user authentication device may output over its speakers a sound sequence that is representative of the application such as a characteristic sound sequence or a synthetic speech rendering of the application name.

In some embodiments the user authentication device is adapted to obtain the user's implicit or explicit confirmation of the representation of the application identity that the user authentication device presents to the user. In some embodiments the user explicitly confirms the representation of the application identity e.g. by clicking an OK button. In some embodiments the confirmation of the representation of the application identity is integrated in an overall confirmation wherein the user approves, e.g., the generation of the Response Message and thereby signals his or her confirmation or approval of all data or messages (which apart from the representation of the application identity may include certain data comprised in the Authentication Initiating Message that must be confirmed by the user) that the user authentication device presented to the user so far in the course of the process to generate a Response Message. In some embodiments the user entering a PIN or password is considered by the user authentication device as an implicit approval or confirmation.

In some embodiments the user authentication device is adapted to abort the generation of the Response Message if the user does not confirm the representation of the application identity. In some embodiments, if the user does not confirm, the user authentication device may nevertheless continue the generation of the Response Message but instead not make the Response Message available to the user or a destination server.

Approval of Transaction Related Data.

In some embodiments the user authentication device may be adapted to extract transaction related data from the Authentication Initiating Message. In some embodiments the transaction related data may be comprised in an encrypted portion of the Authentication Initiating Message or may be cryptographically linked (for example by a server credential) to other data in the Authentication Initiating Message such as a server generated dynamic security value. These transaction-related data may include values for elements of a transaction that the user has submitted to the remote application. For example, in the case of a money transfer transaction these transaction related data may comprise the amount of money to be transferred, the currency code, and the destination account number. In the case of a stock trade transaction the transaction related data may comprise for example the symbol of the stock to be traded, whether to buy or to sell, the price per share and the quantity of shares to be traded.

In some embodiments the user authentication device is adapted to present these transaction related data to the user and obtain the user's implicit or explicit confirmation of the transaction related data that the user authentication device presents to the user. In some embodiments the user explicitly confirms the representation of the transaction related data e.g. by clicking an OK button. In some embodiments the confirmation of the transaction related data is integrated in an overall confirmation wherein the user approves, e.g., the generation of the Response Message and thereby signals his or her confirmation or approval of all data or messages (which apart from the transaction related data may for example include a representation of the application identity that must be confirmed by the user) that the user authentication device presented to the user so far in the course of the process to generate a Response Message. In some embodiments the user entering a PIN or password is considered by the user authentication device as an implicit approval or confirmation.

In some embodiments the user authentication device is adapted to abort the generation of the Response Message if the user does not confirm the transaction related data. In some embodiments, if the user does not confirm, the user authentication device may nevertheless continue the generation of the Response Message but instead not make the Response Message available to the user or a destination server.

Entry of User Provided Data.

In some embodiments the user authentication device may be adapted to prompt the user to enter the values for certain data elements. In some embodiments the user authentication device may use these values in the generation of the dynamic security value and/or in the generation of the Response Message.

PIN Entry and PIN Usage.

In some embodiments the user authentication device is adapted to obtain a PIN or password value from the user. In some embodiments the user may provide the PIN or password value by using the user authentication device's keyboard or touchscreen. In some embodiments the user authentication device is adapted to store a PIN or password reference value and to verify the PIN or password value provided by the user by comparing it with the stored reference value. The user authentication device may deem the PIN or password verification successful if the PIN or password value provided by the user matches the stored reference value. In some embodiments the user authentication device is adapted to abort the generation of the Response Message if the PIN or password verification fails. In some embodiments, if the PIN or password verification fails, the user authentication device may nevertheless continue the generation of the Response Message but instead not make the Response Message available to the user or a destination server.

In some embodiments the user authentication device may use the entered PIN or password value to obtain or generate the value of a secret key. For example, the user authentication device may cryptographically combine the PIN or password value with a master key to derive another key, or it may use the PIN or password value as a key to decrypt an encrypted key value.

In some embodiments the user authentication device is adapted to add a value representative of the entered PIN or password value to the Response Message. In some embodiments the user authentication device is adapted to encrypt a portion of the Response Message that comprises the value representative of the entered PIN or password value.

Cryptographically Generate or Obtain a Dynamic Security Value.

The user authentication device may be adapted to generate or obtain a dynamic security value using a cryptographic algorithm parameterized with at least one secret key.

In some embodiments the at least one secret key that the user authentication device uses to generate the dynamic security value (or dynamic security value generation key) is mathematically related to a base secret that is stored in a storage component of the user authentication device. In some embodiments the base secret may comprise a personalized data element. In the context of this application the terminology 'personalized data element' of a user authentication device refers to a data element that is present in a plurality of user authentication devices having the same function in each device of that plurality of user authentication devices, but having a particular individual value in each particular individual device of the plurality of user authentication devices. In other embodiments the base secret may comprise a master secret that is shared among multiple user authentication devices. In some embodiments the user authentication device is adapted to derive the at least one dynamic security value generation key from the base secret that is stored in a storage component of the user authentication device. In some embodiments the user authentication device is adapted to derive the at least one dynamic security value generation key using a PIN or password or other secret value provided by the user. In some embodiments the at least one dynamic security value generation key is the base secret. In some embodiments the values of the at least one dynamic security value generation key and/or the personalized base secret are associated with a particular user or with a particular user authentication device. In some embodiments the dynamic security value generation key may comprise a symmetric key, such as for example a symmetric encryption or decryption key, the value of which is shared with or is available to an authentication server. In some embodiments the dynamic security value generation key may comprise the private key of a public/private key pair to be used with an asymmetric cryptographic algorithm.

In some embodiments the user authentication device may be adapted to generate the dynamic security value by cryptographically combining a number of input values and the at least one dynamic security value generation key by submitting the input values to a cryptographic algorithm that is parameterized with the at least one dynamic security value generation key. These input values may comprise for example: a dynamic variable (such as a time-related value provided by the user authentication device, and/or a counter-related value provided by the user authentication device, and/or a challenge that the user authentication device extracts from the Authentication Initiating Message), and/or transaction-related data that the user authentication device extracts from the Authentication Initiating Message and that may be confirmed by the user, and/or a session identifier that the user authentication device extracts from the Authentication Initiating Message, and/or a data element that is related to an application identifier that the user authentication device extracts from the Authentication Initiating Message or that is related to a representation of the application identifier that is presented to the user and that may be confirmed by the user. In some embodiments the input values may also comprise data provided to the user authentication device by the user.

In some embodiments the user authentication device may be adapted to generate the dynamic security value using a personalized data element. In some embodiment this personalized data element may comprise a personalized cryptographic key. In some embodiments this personalized data element may comprise a user authentication device identifier related data element (such as a serial number). In some embodiments the user authentication device derives the dynamic security value generation key from a master secret and a personalized data element which in some embodiments may comprise a user authentication device identifier related data element (such as a serial number).

In some embodiments the cryptographic algorithm used by the user authentication device to generate or obtain the dynamic security value may comprise a symmetric cryptographic algorithm. Examples of symmetric cryptographic algorithms may include symmetric encryption/decryption algorithms such as DES (Data Encryption Standard) or AES (Advanced Encryption Standard), symmetric MAC (Message Authentication Code) algorithms, keyed-hashing algorithms such as HMAC (keyed-hash message authentication code) or SHA-1 or MD5 (whereby the at least one dynamic security value generation key hashing algorithm). For example, in some embodiments the user authentication device may encrypt a concatenation of the input values using a symmetric block cipher such as DES or AES in CBC (Cipher Block Chaining) mode and use a part of the resulting cryptogram (preferably a part of the last block of the cryptogram).

In some embodiments the cryptographic algorithm used by the user authentication device to generate or obtain the dynamic security value may comprise an asymmetric cryptographic algorithm. Examples of symmetric cryptographic algorithms may include for example RSA (Rivest-Shamir-Adleman) or DSA (Digital Signature Algorithm). In some embodiments the user authentication device may for example generate a digital signature over the input values using an asymmetric cryptographic algorithm parameterized with the private key of a public-private key pair.

In some embodiments a server generated dynamic security value may be comprised in an encrypted portion of the Authentication Initiating Message and the user authentication device may be adapted to obtain this dynamic security value by decrypting the encrypted portion and extracting the server generated dynamic security value from the decrypted portion.

Removable Security Device

In some embodiments, as illustrated in FIG. 3b, the user authentication device (240) may comprise a removable security device (395) and a communication interface (390) to exchange data and/or messages and/or commands and responses with this removable security device. In some embodiments the removable security device may be adapted to securely store and/or handle secret keys and/or may be adapted to perform certain cryptographic calculations. In some embodiments the user authentication device may rely on the removable security device to securely store and/or manage some secrets (such as cryptographic keys and/or user PIN or password values). In some embodiments the user authentication device may delegate some cryptographic calculations to the removable security device. In some embodiments the user authentication device uses data elements provided by the removable security device to obtain the value of the dynamic security value generation key. In some embodiments the user authentication device delegates some of the cryptographic calculations for deriving the value of the dynamic security value generation key to the removable security device. In some embodiments the user authentication device delegates some of the cryptographic calculations for generating the dynamic security value to the removable security device. In some embodiments the removable security device comprises user authentication related reference data (such as for example reference values for a user PIN or password or a reference template for a user biometric) and the user authentication device uses the removable security device to authenticate the user (e.g. by having the removable security device verify a user PIN or password or a user related biometric).

For example in some embodiments the user authentication device (240) may comprise a communication interface (390) comprising a smart card reader (391) and the removable security device may comprise a smart card or SIM (Subscriber Identity Module) card (395). In some embodiments some aspects of the communication between the smart card and the user authentication device may be specified by the ISO/IEC 7816 standard. In some embodiments the smart card may comprise a card issued by a financial institution. In some embodiments the smart card may comprise an EMV (Europay-Mastercard-Visa) card. In some embodiments the user authentication device may comply partly or entirely with the CAP (Chip Authentication Programme) standard.

Generating a Response Message.

The user authentication device may be adapted to generate a Response Message that comprises at least the generated or obtained dynamic security value. In some embodiments the Response Message may also comprise additional data elements such as for example a session identifier that the user authentication device has extracted from the Authentication Initiating Message, and/or a user authentication device identifier (such as a serial number of the user authentication device) and/or a user identifier (such as a user ID or a user name) and/or an application identifier and/or a nonce. In some embodiments the user authentication device may be adapted to encrypt the Response Message entirely or partially.

Making the Response Message Available to the User or Authentication Server.

In some embodiments the user authentication device may be adapted to make the Response Message available to the user, so that the user may forward the Response Message to the authentication server (for example by copying the Response Message to the access device which may forward the Response Message directly to the authentication server or to the application server which may forward it on its turn to the authentication server). In some embodiments the user authentication device may for example be adapted to display the Response Message as a string of numerical or hexadecimal or alphanumerical digits or characters which the user can read and copy to the access device. In some embodiments the user authentication device may for example be adapted to emit a sequence of synthesized speech snippets representing a string of numerical or hexadecimal or alphanumerical digits or characters which the user can hear and copy to the access device.

In some embodiments the user authentication device may be adapted to send the Response Message to a destination server. In some embodiments the user authentication device may be adapted to send the Response Message to a destination server over a wireless communication network (such as for example a mobile telephony network) by using its wireless data communication interface. In some embodiments the authentication device may for example be adapted to send the Response Message via an SMS (Short Message Service) or it may be adapted to send the Response Message over a wireless IP connection for example in the form of a HTTP Post message.

Types of User Authentication Devices.

In some embodiments the user authentication device may be a dedicated hardware security device. A dedicated hardware security device in this context means that its primary function is to receive and process an Authentication Initiating Message and to generate a dynamic security value in response. It furthermore means that the device comprises a storage component adapted to securely store secrets such as cryptographic keys and/or PIN values and that its application firmware cannot be changed or updated, or that it can only be changed or updated using firmware update protocols that use cryptographic mechanisms to prove to the device the authenticity of the firmware update.

In other embodiments the user authentication device may comprise a device the primary function of which is not to receive and process an Authentication Initiating Message and to generate a dynamic security value in response and that may allow the free addition or update of software applications by the user. For example the user authentication device may comprise a smart phone.

Method to Secure an Application.

Figure 4A:
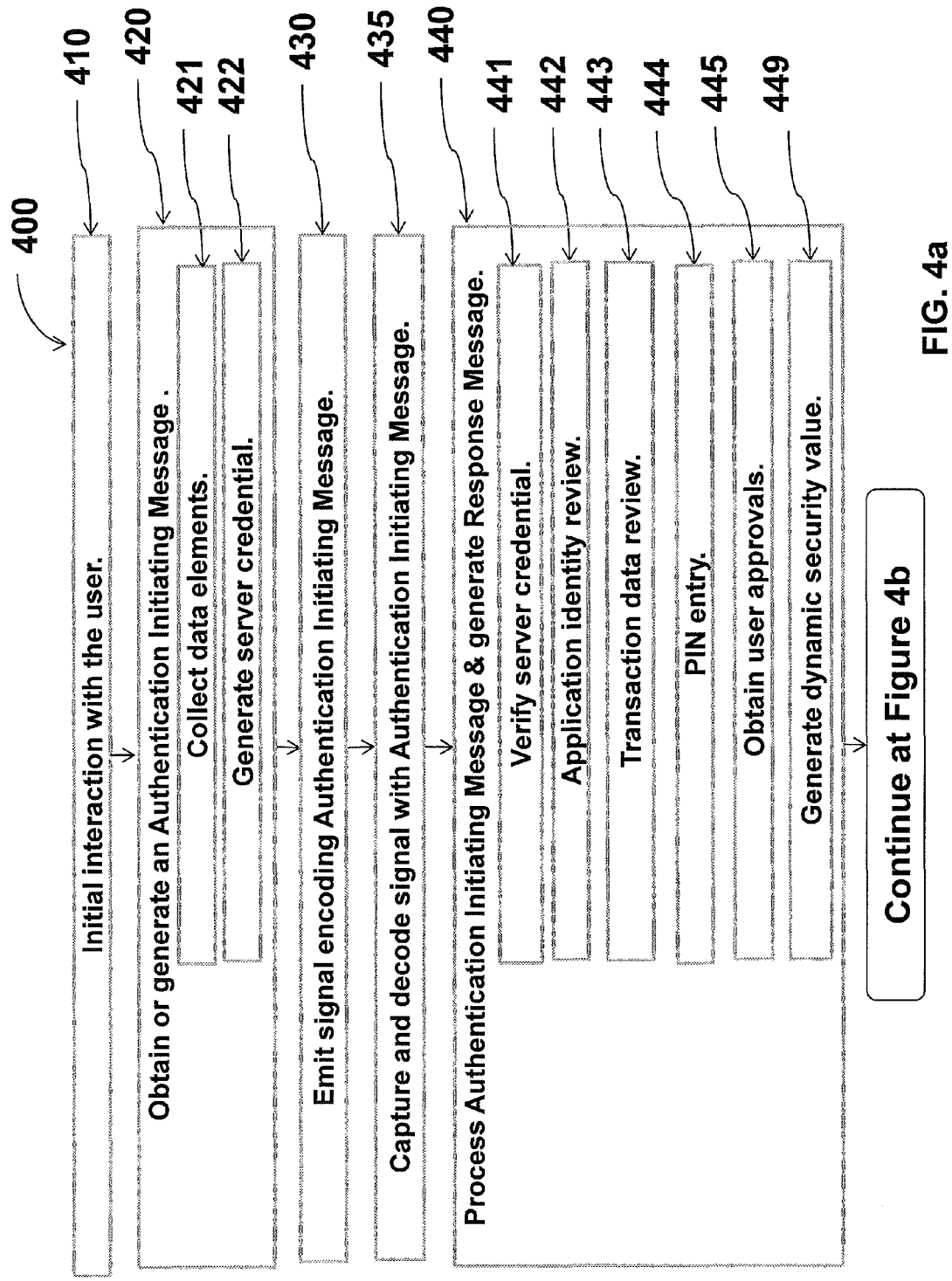
FIGS. 4a and 4b schematically illustrate a method to secure a remotely accessible application according to an aspect of the invention.
Figure 4B:
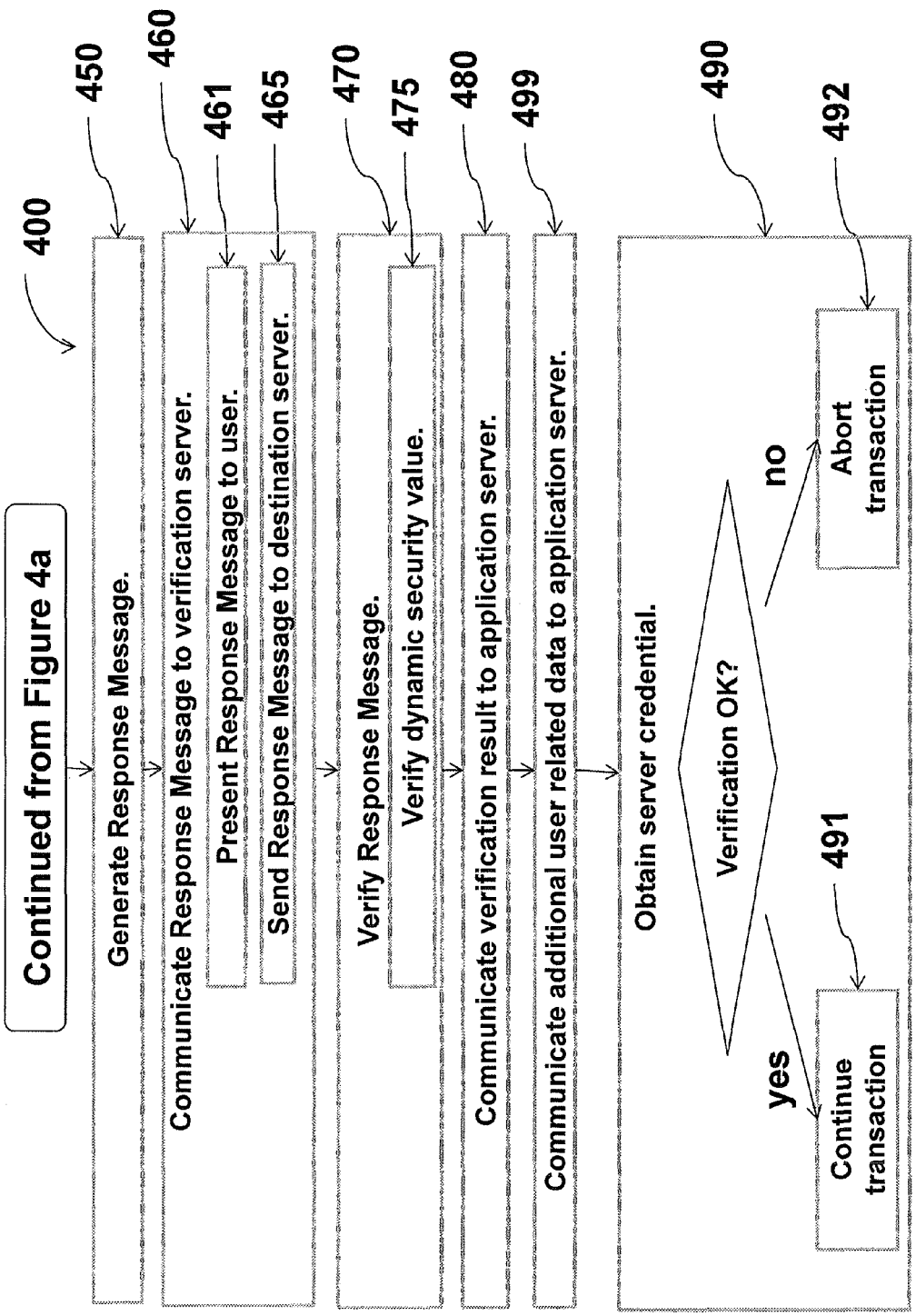

FIGS. 4a and 4b illustrate a method (400) to secure a remotely accessible application being accessed by a user using for example a system such as the system discussed in relation to FIG. 2.

The method comprises the following steps.

Initial Interaction of the User with the Application

In a first step a remotely accessible application hosted by an application server interacts with a user by exchanging (410) data and messages with an access device being used by the user to access and interact with the application. For example the application may receive an access request from the access device, or the application may receive from the access device (e.g. in a transaction request message) transaction data submitted by the user. In some embodiments the application is a web-based application and the application interacts with a web-browser on the access device e.g. by exchanging HTTP messages. At some point the application may require the user or the data submitted by the user to be authenticated. In some embodiments the user may have communicated its (claimed or presumed) identity to the application before the commencement of the authentication process. In other embodiments the application starts the authentication process before the user has been identified. For example, in some embodiments the user may submit an access request comprising the user's user name or login name or account number. In other embodiments that user may submit an anonymous access request that doesn't comprise an indication of the user identity.

Obtain or Generate an Authentication Initiating Message (420).

In a following step the application may collect (421) a number of data elements and assemble these data elements in an Authentication Initiating Message. The application may for example collect a challenge, and/or transaction data to be authenticated (and that may have to be presented by the user authentication device to the user for approval), and/or a session identifier, and/or an application identifier (that may be used by the user to identify the application and that may be presented by the user authentication device to the user for approval), and/or a server credential (that may be verified by the user authentication device to authenticate the origin and/or the contents of the Authentication Initiating Message), and/or a response or destination address (that may be used by the user authentication device when sending a Response Message), and/or a nonce (that may be used by the user authentication device to derive secret cryptographic keys such as for example a server credential verification key or a dynamic security value generation key), and/or a user identifier (for example a user name that the user provided in an access or login request). Some or all of these data elements may have been generated by the application. Some or all of these data elements may have been generated by another entity and may have been obtained by the application from this entity. This entity may for example be an authentication server trusted by the application. Examples of data elements that may have been generated and provided to the application by another entity such as a trusted authentication server may comprise: a challenge, and/or a session identifier, and/or a server credential, and/or a nonce, In some embodiments the same data element may have more than one function. For example, in some embodiments a single data element may combine the function of challenge, session identifier and nonce.

In some embodiments collecting the data elements and/or using them to generate an Authentication Initiating Message may be entirely done by the application on the application server. In some embodiments collecting the data elements and/or using them to generate an Authentication Initiating Message may be partly done by the application on the application server and may be partly done under control of the application on the access device (e.g. by an applet such as a java applet or a browser plugin associated with the application). In some embodiments collecting the data elements and/or using them to generate an Authentication Initiating Message may be entirely done under control of the application on the access device (e.g. by an applet such as a java applet or a browser plugin associated with the application). In some embodiments the entire Authentication Initiating Message may be generated by another entity such as a trusted authentication server and provided to the application (for example by sending the generated Authentication Initiating Message to the application server hosting the application or by sending it to the access device that the application server is interacting with). For example in some embodiments the application server may collect all data elements and generate an Authentication Initiating Message and send it to the access device. In some embodiments the application server may collect all data elements and send them to the access device where the Authentication Initiating Message is generated using these data elements (e.g. by an applet such as a Java applet or a browser plugin associated with the application). In some embodiments the application server may collect some data elements and send them to the access device and the access device may collect some other data elements and the Authentication Initiating Message is generated at the access device using these data elements (e.g. by an applet such as a Java applet or a browser plugin associated with the application). In some embodiments another entity such as an authentication server may collect all data elements and generate the Authentication Initiating Message and send it to the application server (which may forward it to the access device) or send it directly to the access device.

Generate a Server Credential (422)

In some embodiments the Authentication Initiating Message comprises a server credential. In some embodiments the Authentication Initiating Message may be generated by using a cryptographic algorithm parameterized by a secret key. In some embodiments the server credential is generated by the authentication server. The server credential may be used for cryptographically binding and/or authenticating at least some of the data elements comprised in the Authentication Initiating Message. For example in some embodiments the server credential may be used to authenticate an application identifier and/or transaction related data comprised in the Authentication Initiating Message. In some embodiments the server credential may for example be used to cryptographically bind for example a server generated dynamic security value comprised in the Authentication Initiating Message to an application identifier and/or transaction related data also comprised in the Authentication Initiating Message. In some embodiments the server credential comprises an encrypted portion of the Authentication Initiating Message. In embodiments the server credential comprises the entire encrypted Authentication Initiating Message. In some embodiments the server credential comprises an encrypted portion of the Authentication Initiating Message that comprises at least a server generated dynamic security value.

Emit (430) at the access device a signal that encodes the representation of an Authentication Initiating Message.

The access device may obtain the Authentication Initiating Message or a representation of it as described in more detail above. After having obtained the Authentication Initiating Message or a representation of it, the access device emits a signal encoding the Authentication Initiating Message. The access device may emit this signal using its user output interface as described in more detail above.

Capture at the user authentication device the emitted signal and decode to obtain the Authentication Initiating Message (435).

When the signal that encodes the Authentication Initiating Message is being emitted by the access device, it may be captured by the user authentication device as described in more detail above. The Authentication Initiating Message may then be decoded by the user authentication device from the captured signal as described in more detail above.

Process the Authentication Initiating Message and Generate a Response Message (440)

Once the Authentication Initiating Message has been obtained by the user authentication device, it may be processed and a Response Message comprising a dynamic security value may be generated by the user authentication device.

The Authentication Initiating Message may be processed to obtain its contents and, if applicable (e.g. if the Authentication Initiating Message comprises a server credential), authenticate it or its contents as described in more detail above.

Server Credential Verification (441)

If applicable (e.g. if the Authentication Initiating Message comprises a server credential), may be processed to authenticate it or its contents as described in more detail above. In some embodiments the Authentication Initiating Message may comprise a server credential and this server credential may be verified by the user authentication device as described in more detail above e.g. to authenticate the origin of the Authentication Initiating Message or some of its contents. If the server credential verification fails, the user authentication device may abort further steps of the authentication process. In such a case the user authentication device may inform the user of the failure.

Application Identity Presentation (442)

In some embodiments the Authentication Initiating Message comprises an application identifier which the user authentication device uses to obtain a representation of the application identity. The representation of the application identity may be presented to the user by means of its user output interface and the user's approval of the presented representation of the application identity may be captured by the user authentication device. The approval may be used in further steps of the authentication process.

In some embodiments the Authentication Initiating Message may comprise an application identifier as well as a server credential which authenticates at least the application identifier comprised in the Authentication Initiating Message, whereby the server credential has been generated by the authentication server and whereby the authentication server may have verified that the application identifier matches the identity of the application for which it has generated the server credential so that the user can be confident that the Authentication Initiating Message indeed originates from the application associated with the application identifier.

Transaction Data Presentation (443)

In some embodiments the Authentication Initiating Message may comprise one or more transaction related data elements which may be presented to the user by the user authentication device by means of its user output interface to be reviewed and/or approved by the user. The user's approval of the presented transaction related data may be captured by the user authentication device. The approval may be used in further steps of the authentication process.

PIN Entry (444)

In some embodiments the user may be prompted by the user authentication device to provide a PIN or password and the user authentication device may capture the PIN or password that the user provides and use it as described above. In some embodiments the entry of the user of a PIN or password acts as an implicit approval. It may for example be considered by the user authentication device as an approval of data elements or messages (e.g. representing the application identity or transaction related data) that have been presented by the user authentication device to the user up to this point in the authentication process, or it may be considered an approval of the user for the user authentication device to go ahead with the generation of a dynamic security value and/or generation of the Response Message and/or sending the Response Message to a destination server.

Obtain User Approval (445).

One or more implicit or explicit user approvals may be required by the user authentication device (e.g. an approval to go ahead with the authentication process, or an approval of the application identity or an approval of transaction related date). In some embodiments the user authentication device explicitly requests the user to provide an approval (e.g. displaying a message such as "do you approve the following transaction data?" or "do you want to get access now to the following application?") and explicitly presents the user with a choice whether to approve or note (for example: "yes/no" or "continue/cancel") and the user can explicitly provide the approval by making a choice and explicitly indicating the appropriate choice to the user authentication device. In some embodiments the user indicates approval in an implicit way. For example by just continuing (instead of aborting) the normal user interaction when being presented with certain data or messages to be reviewed or by for example entering a PIN or password when certain data or messages have been presented to the user.

Use and Verification of User Approvals in the Authentication Process.

The continuation of the authentication process may be dependent on one or more of these user approvals and the authentication process may be aborted at some point if one or more of the approvals are not provided by the user or if the user disapproves. For example in some embodiments the generation of a dynamic security value and/or the generation of the Response Message comprising the dynamic security value may be aborted if the user approval has failed. In some embodiments, if the required user approvals have not been obtained, the user authentication device may not send the generated Response Message to a destination server or may not present the Response Message to the user.

In some embodiments the user approvals may be implicit in the Response Message as they are a necessary condition for the user authentication device to generate the dynamic security value and/or the Response Message or for the user authentication device to present the Response Message to the user or to send the Response Message to a destination server. In such embodiments the authentication server that verifies the dynamic security value may implicitly verify the user approvals by verifying the dynamic security value since the authentication server would never receive a Response Message with a valid dynamic security value if the user would not have provided the required approvals.

In some embodiments the user authentication device includes data elements indicating the user approvals (or lack thereof) in the cryptographic calculation of the dynamic security value and may or may not include these data elements in the Response Message. For example the user authentication device may use a data element that comprises bit flags that indicate whether the user was prompted to provide a certain approval and/or whether the user indeed provided this approval. In some embodiments the user authentication device may include these data elements that are indicative of the user approvals as inputs for the cryptographic algorithm to generate the dynamic security value and may include these data elements also in the contents of the Response Message. A verification serve that receives the Response Message may then verify whether these data elements indicate a satisfactory status with respect to the approvals by the user and may cryptographically verify whether the dynamic security value comprised in the same Response Message is consistent with the values of these data elements. In other embodiments the user authentication device may include the data elements that are indicative of the user approvals as inputs for the cryptographic algorithm to generate the dynamic security value but may not include these data elements also in the contents of the Response Message. A verification serve that receives the Response Message may then assume certain values for these data elements that are mandatory for the Response Message to be accepted (e.g. values that indicate that the user provided all required approvals) and may cryptographically verify whether the dynamic security value comprised in the same Response Message is consistent with these assumed values for these data elements.

Generate a Dynamic Security Value (449)

After the user authentication device has obtained all data elements that are required to generate a dynamic security value, the dynamic security value may be generated as has been described above.

The generation of the dynamic security value by the user authentication device may be conditional on certain verifications and/or events. For example it may be conditional on the successful verification of a server credential comprised in the Authentication Initiating Message, or it may be conditional on the user providing certain required approvals, or it may be conditional on the successful verification of a PIN or password entered by the user.

Generate a Response Message (450)

As described above, a Response Message may be generated by the user authentication device comprising the dynamic security value. The Response Message may also comprise other data elements such as for example a data element related to the application identity, and/or a session identifier, and/or a user identifier (which may be stored in the user authentication device, or may have been extracted from the Authentication Initiating Message, or may have been provided to the user authentication device by the user), and/or a user authentication device identifier (which may be stored in the user authentication device such as a serial number), and/or flags indicating user approvals.

The generation of the Response Message by the user authentication device may be conditional on certain verifications and/or events. For example it may be conditional on the successful verification of a server credential comprised in the Authentication Initiating Message, or it may be conditional on the user providing certain required approvals, or it may be conditional on the successful verification of a PIN or password entered by the user.

Making the Response Message Available to a Verification Server (460).

The generated Response Message may then be communicated to a verification server such as the authentication server.

Presenting the Response Message to the User (461).

In some embodiments the Response Message is presented by the user authentication device to the user by means of the user output interface after which the user may copy the Response Message to the access device which in turn may send the Response Message directly to a verification server such as the authentication server or may send it to the application server which may forward it to the verification server.

Presenting the Response Message to the user by the user authentication device may be conditional on certain verifications and/or events. For example it may be conditional on the successful verification of a server credential comprised in the Authentication Initiating Message, or it may be conditional on the user providing certain required approvals, or it may be conditional on the successful verification of a PIN or password entered by the user.

Sending the Response Message to a Destination Server (465).

In some embodiments the Response Message is sent to a destination server (which may for example be the application server or the authentication server) by the user authentication device using a data communication interface. In some embodiments this data communication interface comprises a wireless data communication interface. In some embodiments this wireless data communication interface comprises an interface to send data messages over a public mobile communication network such as a GSM or UMTS network.

In some embodiments the destination address of the destination server is stored in the user authentication device. In some embodiments the user authentication device may determine the destination address using a destination address related data element extracted from the Authentication Initiating Message. In some embodiments the user authentication device verifies whether the determined destination address is allowable. It may for example compare the determined destination address to a black list of forbidden addresses or to a white list of allowed addresses or it may verify whether it satisfies a number of rules.

Sending the Response Message to a destination server indicated by the determined destination address by the user authentication device may be conditional on certain verifications and/or events. For example it may be conditional on the successful verification of a server credential comprised in the Authentication Initiating Message, or it may be conditional on the user providing certain required approvals, or it may be conditional on the successful verification of a PIN or password entered by the user.

Verification of the Response Message (470).

After the Response Message has been received at the verification server, it may be verified. The verification of the Response Message may comprise various steps and parts of the verification may be done by the application server and parts of the verification may be done by the authentication server.

In some embodiments part of the verification of the Response Message comprises whether the values of certain data elements in the Response Message have acceptable values. In some embodiments this may comprise verifying that some of these values are within a certain range. In some embodiments this may comprise verifying that some of these values have one of a limited number of allowable values. For example in some embodiments the Response Message may comprise flags that indicate whether or not the user has approved certain data elements and part of the verification may comprise verifying that these flags indicate that the user has indeed provided certain approvals. In some embodiments the Response Message may comprise a data element that is related to the representation of an application identifier that has been presented to the user and verification of the Response Message may comprise verifying that the value of this data element corresponds to the presentation of the application identifier that the user was supposed to review. For example, in some embodiments the Authentication Initiating Message may comprise a URL pointing to an application logo to be retrieved by the user authentication device and presented to the user. In some of these embodiments the Authentication Initiating Message and/or the process to retrieve the logo are not cryptographically secured so that it cannot be excluded that a wrong logo was presented to the user. To detect whether a wrong logo was presented to the user, the user authentication device in such embodiments may include in the Response Message (and possibly also in the calculation of the dynamic security value) e.g. a hash of the logo that was effectively presented to the user. Verification of the Response Message may then comprise that this hash value corresponds to the logo that was supposed to be presented to the user. In some embodiments the user authentication device may capture some input from the user and include that in the Response Message (and possibly also in the calculation of the dynamic security value). For example in some embodiments the user authentication device may prompt the user to enter a PIN or password that may be known to the application or authentication server and include a data element representative of the PIN or password in the Response Message (possibly in an encrypted portion of the Response Message). Part of the verification of the Response Message may then comprise verifying by the appropriate server the value of this PIN or password related data element.

Verification of the Response Message may also comprise verification of the dynamic security value (475).

In some embodiments the Authentication Initiating Message may comprise a server generated dynamic security value and verification of the dynamic security value in the Response Message may comprise comparing the dynamic security value received in the Response Message with the server generated dynamic security value.

In some embodiments verification of the dynamic security value comprises verifying the cryptographic validity of the dynamic security value.

In some embodiments this comprises determining reference values for the data elements that are assumed to have been used in the calculation of the dynamic security value by the user authentication device. In some embodiments the: source of the reference values of some of these data elements may be Response Message (for example user approval flags and/or application identity related data). In some embodiments the source of the reference values of some of these data elements may be the application server (for example a challenge that the application included in the Authentication Initiating Message and that is not comprised in the Response Message but is used as input in the calculation of the dynamic security value, or for example transaction related data). In some embodiments the source of the reference values of some of these data elements may be the authentication server (for example the value of a challenge originally provided by the authentication server). In some embodiments the determination of the reference values of certain data elements may be based on assumptions. For example in some embodiments the user authentication device may use a counter related value in the calculation of the dynamic security value and the authentication server may keep a copy of this counter related value and use a synchronisation algorithm to determine the value that the user authentication device may be assumed to use, or the user authentication device uses a time-related value in the calculation of the dynamic security value and the authentication server may estimate the value of this time-related value based on the time of reception of the response message.

In some embodiments the cryptographic validation of the dynamic security value comprises the retrieval of a cryptographic verification key. In some embodiments this verification key is associated with the user authentication device and may be retrieved using a user authentication device identifier comprised in the Response Message. In some embodiments this verification key is associated with the user and may be retrieved using a user identifier comprised in the Response Message. In some embodiments retrieving the verification key may comprise doing a look-up in database using a user identifier or a user authentication device identifier related data element as search index. In some embodiments retrieving the verification key may comprise doing a key derivation or diversification from a master key using a user identifier or a user authentication device identifier related data element as derivation or diversification seed.

In some embodiments a verification key used in the cryptographic verification of the dynamic security value comprises a secret symmetric key that has also been used by the user authentication device in the calculation of the dynamic security value. In some embodiments a verification key used in the cryptographic verification of the dynamic security value comprises a public key of a public-private key pair the private key of which has been used by the user authentication device in the calculation of the dynamic security value. In some embodiments the cryptographic validation of the received dynamic security value comprises executing a cryptographic algorithm on the above mentioned reference values using the above mentioned cryptographic verification key and comparing the result of this cryptographic operation with the received dynamic security value. For example in some embodiments cryptographic validation of the received dynamic security value may comprise calculating a keyed hash or a MAC over the above mentioned reference values (wherein the keyed hash or MAC algorithm is parameterized with a secret symmetric verification key that may have been retrieved as described above). In some embodiments the cryptographic validation of the received dynamic security value comprises executing a cryptographic algorithm on the received dynamic security value using the above mentioned cryptographic verification key and comparing the result of this cryptographic operation with the above mentioned reference values. For example in some embodiments the cryptographic validation of the received dynamic security value comprises decrypting the dynamic security value with an asymmetric decryption algorithm using the public key that corresponds to the private key that was used by the user authentication device to generate the dynamic security value, and subsequently compare the decrypted value with a hash of the above mentioned reference values.

Communicate a Verification Result to Application Server (480).

In some embodiments at least a part of the verification of the Response Message is done by a trusted authentication server and the result of verification done by the trusted authentication server is communicated to the application server. In some embodiments apart from the verification result also other data elements may be communicated to the application server. For example in some embodiments the authentication server may communicate data elements comprised in the Response Message to the application server, such as for example a session identifier or a user identifier or a data element related the representation of the application identity that was presented to the user or other data elements that may have been presented to the user by the user authentication device (such as transaction related data) or that may have been provided to the user authentication device by the user. Receiving a session identifier may allow the application server to determine for which application session the communicated results are applicable. Receiving a user identifier may allow the application server to determine the identity of the user without the user having to manually provide that identity to the application thus increasing the overall user convenience. Receiving data that has been presented to the user by the user authentication device allows the application server to verify that the correct data was presented to the user.

In some embodiments the communication between the application server and the authentication server may be secured. For example in some embodiments messages from the authentication server to the application server may be cryptographically authenticated to demonstrate to the application server that they originate from the legitimate authentication server. In some embodiments messages from an application server to the authentication server may be cryptographically authenticated to demonstrate that they originate from a legitimate application server. In some embodiments some messages may be encrypted to guarantee confidentiality of the contents of the messages. In some embodiments some messages may be cryptographically protected (e.g. with cryptographic checksums or signatures) to guarantee the integrity of the contents of the messages.

In some embodiments the authentication server may determine the application server and send the verification result possibly along with additional data to the application server. In some embodiments the additional data may comprise data (such as a session identifier or a user identifier) that allow the application server to link the verification results provided by the authentication server to an application session.

In other embodiments the application server may poll the authentication server for the verification result. In the poling request messages that the application server sends to the authentication server the application server may include data that the authentication server may use to match the polling request to the correct one of the Response Messages that it has received. These data may for example include data such as a session identifier or a user identifier that may match corresponding data elements in the Response Message. In some embodiments the application server also provides to the authentication server data that may be required for the validation of the dynamic security value such as for example the values of transaction related data that have been used in the calculation of the dynamic security value.

Communicate Additional User Related Data to Application Server (499).

In some embodiments the trusted authentication server may store and manage user related data that are not required for the verification of the Response Message but that may be of value to the application. Such data may for example include the user's username for the give application, personal information (such as the user's real name, physical address, and/or telephone number), financial information (such as credit card number), and/or user profile information. In some embodiments the authentication serve may pass some of this information to the application together with the communication of the verification result. This may be dependent on successful verification of the dynamic security value. In some embodiments this may be subject to policy rules and a user profile configuration. For example in some embodiments a user may have a profile with the authentication server comprising a plurality of user related data and the user may be able to configure that profile to indicate which data may be communicated to which application on which conditions. In some embodiments the Authentication Initiating Message may comprise a request to be presented to the user by the user authentication device to approve that the authentication server passes certain data to the application server (such as for example the user's telephone number or address or credit card number). The user authentication device may present this request to the user and include the user's response in the Response Message and in the calculation of the dynamic security value. Upon positive verification of the Response Message the authentication server may conclude that the user has approved the release of the requested data to the application and communicate the requested data to the application server In some embodiments the application may include in the Authentication Initiating Message requests for the user to provide certain data (such as an application specific password) or requests to release to the application certain data stored by the authentication server whereby the authentication server may upon successful verification of the Response Message communicate the requested data (i.e. the entered or released information) to the application server. In some of these embodiments the communication of the requested date to the application server by the authentication server may be dependent on the successful verification by the authentication server that the user authentication device presented a representation of the application identity to the user which the user approved and that the representation of the application identity that has been presented to and has been approved by the user indeed matches the identity of the application requesting the data. In some of these embodiments the application identifier in the Authentication Initiating Message is authenticated by a server credential also comprised in the Authentication Initiating Message such that the user can be confident that the request for the data indeed comes from the purported application.

React at the Application Server as a Function of the Verification Result (490).

Depending on the result of the verification of the Response Message the application may take appropriate action. For example in case of a successful verification the application may grant access to the user or may execute the submitted transaction (491), and in case of an unsuccessful verification the application may refuse to grant access to the user or to execute the submitted transaction (492).

Cryptographic Linking of Application Identifier to Dynamic Security Value.

In some embodiments the Authentication Initiating Message comprises an application identifier which is used by the authentication user device to obtain a representation of the application identity that it presents to the user. In some embodiments this application identifier or the corresponding representation of the application identity may be cryptographically linked to the dynamic security value that the user authentication device may generate.

In some embodiments the application identifier or the corresponding representation of the application identity is directly cryptographically linked to the generated dynamic security value. For example in some embodiments the application identifier or the corresponding representation of the application (or a data element mathematically related to the application identifier or the corresponding representation of the application) is one of the input data elements for the cryptographic algorithm used by the user authentication device to generate the dynamic security value.

In some embodiments the application identifier or the corresponding representation of the application identity is indirectly cryptographically linked to the generated dynamic security value. For example in some embodiments the application identifier comprised in the Authentication Initiating Message is cryptographically linked to other data elements in the Authentication Initiating Message (for example by means of a server credential) that may be used by the user authentication device as the input data elements for the cryptographic algorithm used by the user authentication device to generate the dynamic security value. In some embodiments this cryptographic link between the application identifier and other data elements comprised in the Authentication Initiating Message may be verified by the user authentication device. For example in some embodiments the application identifier is cryptographically linked by a server credential (such as a server signature or a keyed hash or a MAC over data of the Authentication Initiating Message) to other data elements (such as a challenge or a session identifier) in the Authentication Initiating Message which the user authentication device (after successful verification of the server credential) uses as input in the cryptographic algorithm for the generation of the dynamic security value.

In some embodiments the Authentication Initiating Message may comprise an application identifier and a server generated dynamic security value which are cryptographically linked (e.g. by a server credential) whereby the user authentication device may include this server generated dynamic security value in the Response Message whereby this inclusion may be conditional upon successful verification by the user authentication device of the cryptographic link between the application identifier and the server generated dynamic security value in the Authentication Initiating Message).

MODES FOR CARRYING OUT THE INVENTION

Some embodiments of methods according to the invention.

A first class of embodiments of methods of the present invention comprises methods for securing interaction with an application by a user who remotely accesses said application through an access device that is connected to an application server hosting said application, the methods comprising the steps of:

at a user authentication device capturing a signal emitted by the access device, said signal encoded with an authentication initiating message, said authenticating initiating message comprising at least an application identifier corresponding to an identity of the application;

at the user authentication device decoding said signal and obtaining the authentication initiating message;

at the user authentication device retrieving from the authentication initiating message the application identifier;

at the user authentication device using the application identifier to obtain a human interpretable representation of the application identity and presenting the obtained application identity representation to the user using a user output interface of the user authentication device;

at the user authentication device obtaining from the user, using a user input interface of the user authentication device, an approval for generating a response message and making the response message available to a verification server;

at the user authentication device generating a dynamic security value using a first cryptographic algorithm parameterized with a cryptographic dynamic security value generation key and using at least one personalized data element that is associated with the particular user or the particular user authentication device, wherein the generated dynamic security value is cryptographically linked to the application identity presented to the user;

at the user authentication device generating a response message comprising at least the generated dynamic security value;

making the generated response message available to a verification server;

at the verification server receiving the response message; verifying the response message including verifying the validity of the dynamic security value;

communicating the result of the verification of the response message to the application.

A second class of embodiments of methods of the present invention comprises methods of the first class wherein the response message further comprises a data element that is indicative of an identity of the user or an identity of the user authentication device and wherein said data element indicative of the user identity or the user authentication device identity is used to determine a user identity and wherein said user identity is also communicated to the application.

A third class of embodiments of methods of the present invention comprises any of the methods of the first and second classes wherein the user identity is determined also as a function of the application identity.

A fourth class of embodiments of methods of the present invention comprises any of the methods of the first to third classes wherein all application dependent data used to obtain the application identity representation are obtained by the user authentication device from a source external to the user authentication device or from the authentication initiating message.

A fifth class of embodiments of methods of the present invention comprises any of the methods of the first to fourth classes that further comprise the steps of generating a server credential to be included in the authentication initiating message, said generating using a second cryptographic algorithm parameterized with a cryptographic server credential generation key; retrieving at the user authentication device from the authentication initiating message the included server credential; and verifying at the user authentication device the server credential using a third cryptographic algorithm parameterized with a cryptographic server credential verification key.

A sixth class of embodiments of methods of the present invention comprises any of the methods of the fifth class wherein the application identifier comprised in the authentication initiating message is cryptographically linked to the server credential.

A seventh class of embodiments of methods of the present invention comprises any of the methods of the first to sixth classes wherein the step of generating a response message further comprises at the user authentication device including in the response message generated by the user authentication device a data element indicative of the application identity representation presented to the user.

An eighth class of embodiments of methods of the present invention comprises any of the methods of the seventh class that further comprise verifying at the verification server whether the data element that is indicative of the application identity representation presented to the user is consistent with the application identity indicated by the application identifier comprised in the authentication initiating message.

A ninth class of embodiments of methods of the present invention comprises any of the methods of the first to eighth classes that further comprise the steps of: retrieving at the user authentication device from the authentication initiating message transaction related data comprised in the authentication initiating message; presenting at the user authentication device the retrieved transaction related data using a user output interface of the user authentication device; wherein the generated dynamic security value is cryptographically linked to the transaction related data.

A tenth class of embodiments of methods of the present invention comprises any of the methods of the ninth class that further comprise the steps of generating a server credential to be included in the authentication initiating message, said generating using a second cryptographic algorithm parameterized with a cryptographic server credential generation key; retrieving at the user authentication device from the authentication initiating message the included server credential; verifying at the user authentication device the server credential using a third cryptographic algorithm parameterized with a cryptographic server credential verification key; wherein the server credential is cryptographically linked to the transaction related data.

An eleventh class of embodiments of methods of the present invention comprises any of the methods of the ninth class that further comprise the steps of including at the user authentication device in the response message generated by the user authentication device data elements that are indicative of the transaction related data presented to the user; and at the verification server verifying whether the data elements that are indicative of the transaction related data presented to the user are consistent with the transaction related data comprised in the authentication initiating message.

A twelfth class of embodiments of methods of the present invention comprises any of the methods of the first to eleventh classes wherein the dynamic security value generation key comprises a secret personalized key; and wherein the user authentication device calculates the dynamic security value by cryptographically combining the dynamic security value generation key with at least a dynamic input value; and wherein said dynamic input value comprises at least one of a time-related value provided by a time-mechanism in the user authentication device, a counter-related value stored and maintained by the user authentication device, or a challenge comprised in the authentication initiating message.

A thirteenth class of embodiments of methods of the present invention comprises any of the methods of the twelfth class wherein the user authentication device calculates the dynamic security value by cryptographically combining the dynamic security value generation key also with a data element that is indicative of the application identity representation presented to the user.

A fourteenth class of embodiments of methods of the present invention comprises any of the methods of the twelfth class wherein the user authentication device retrieves from the authentication initiating message transaction related data comprised in the authentication initiating message and presents these transaction related data to the user; and wherein the user authentication device calculates the dynamic security value by cryptographically combining the dynamic security value generation key also with data elements that are indicative of the transaction related data presented to the user.

APPARATUS ACCORDING TO THE INVENTION

A first class of embodiments of devices of the present invention comprises apparatus for generating authentication credentials comprising a processing component adapted for processing data; a storage component for storing data; a user interface component comprising a first user output interface for presenting outputs to a user and an input user interface for receiving input from the user; and a data input interface adapted to capture a signal emitted by a second user output interface of an access device that the user is using for remotely accessing an application over a computer network, said signal encoded with an authentication initiating message, said authenticating initiating message comprising at least an application identifier corresponding to an identity of said application; whereby the apparatus is adapted to decode said signal and obtain the authentication initiating message; retrieve from the authentication initiating message the application identifier; use the application identifier to obtain a human interpretable representation of the application identity and present the obtained application identity representation to the user using the first user output interface; obtain from the user, using the user input interface, an approval for generating a response message and making the response message available to a verification server; generate a dynamic security value using a first cryptographic algorithm parameterized with a cryptographic dynamic security value generation key and using at least one personalized data element that is associated with the user or the apparatus, wherein the generated dynamic security value is cryptographically linked to the application identity presented to the user; and generate a response message comprising at least the generated dynamic security value.

A second class of embodiments of devices of the present invention comprises any of the apparatus of the first class of apparatus that are further adapted to present the generated response message to the user using the first user output interface.

A third class of embodiments of devices of the present invention comprises any of the apparatus of the first class of apparatus that further comprise a data communications interface adapted to communicate said response message to a verification server.

An embodiment of a system of the present invention comprises a system for securing interaction with an application by a user who remotely accesses said application through an access device that is connected to an application server hosting said application, comprising a plurality of user authentication devices as described above and a verification server adapted to receive a response message generated by any of the plurality of user authentication devices, and adapted to verify the received response message including verifying the validity of the dynamic security value comprised in the response message, and adapted to communicate the result of the verification of the response message to the application.

ADVANTAGEOUS EFFECTS

The advantages of the invention described above include the following.
 True Multi-Application Support.
 Trust Model.
 The invention is suitable for a multi-application environment with the following trust model. Users trust a trusted authentication server to correctly handle their authentication credentials towards a number of applications and to rely on a user authentication device provided and/or controlled by the trusted authentication device and to some extent to correctly manage certain data that they have provided to the trusted authentication server. Applications trust the trusted authentication server with respect to the verification of authentication credentials (i.e. the dynamic security values comprised in the Response Messages). There is no need for applications to trust each other. More in particular they don't have to share any secrets with each other. Users trust a particular application only within the scope and context of that particular application. I.e. users don't trust any application to responsibly act on behalf of the user in the scope and context of any other application and therefore don't wish to provide applications with credentials that they could use to access other applications on behalf of the user.

In some embodiments of the application the dynamic security value is cryptographically linked to an application identifier which is presented to, reviewed by and approved by the user. This cryptographic link effectively limits the validity of a generated Response Message to a particular application and ensures that credentials (Response Messages) generated for one application cannot be recycled for another application.

Flexibility to Support Extra Applications

Since the user authentication device doesn't require different cryptographic keys or different configuration data for different applications (more in particular there is no need for the user authentication devices to store any application specific data such as for example representations of the application identities), extra applications can easily be supported. The only thing that is required for an extra application to be supported is that this extra application establishes a trust relation with the trusted authentication server.

High Security.

The user authentication devices have been personalized with individual cryptographic keys such that they are capable of generating dynamic security values that are specific for any particular user authentication device and therefore (by virtue of the known association between a particular user authentication device and its associated user) for the legitimate user of that authentication device. Any credential that is generated by a particular user authentication device is therefore cryptographically linked to that particular user authentication device (and its associated user).

The use of a dynamic variable (such as a challenge or a counter or a time-value) in the calculations of the dynamic security values ensures the unpredictability of the generated dynamic security values and protects against replay attacks.

The presentation of a human-interpretable and recognisable representation of the application identity and the cryptographic link thereof with the dynamic security value protects against harvesting of valid credentials by rogue applications (e.g. real-time phishing attacks) to use them to get access to other applications.

The presentation of transaction data on the trusted user authentication device and the inclusion of the approved transaction data in the calculation of the dynamic security value protects against MITM (man-in-the-middle) attacks whereby a rogue party intercepts and alters transaction data being submitted to an application by a legitimate user.

High User Convenience.

The user doesn't have to remember any application specific security data such as application specific passwords. The invention even allows for automatic user identification to the application by the authentication server such that the user no longer has to remember but also no longer has to enter any application specific user name or user id. The invention also provides for the automatic communication to applications of other data that commonly have to be provided to a wide range of applications (contact information, address, or credit card number) thereby avoiding tedious manual data entry.

Because the invention can work with any normal standard access device and doesn't require any specific hard- or software to be present on the access device (i.e. a standard web browser to interact with the application and a normal user output interface to emit the Authentication Initiating Message are sufficient) the invention ensures a very high degree of mobility and autonomy to the users, Cost Effectiveness.

Because the same user authentication device can be used for an inherently unlimited number of applications, the solution of the invention is very cost effective. Also, since the solution poses very little requirements to the access device (other than that it should have a normal user output interface to emit the signal encoding the Authentication Initiating Message) there are no tedious and costly support issues usually associated with the installation on access devices of specific hardware and/or software (such as for example smart card readers and their associated drivers).

Some embodiments of the user authentication device rely only on symmetric cryptography and don't use asymmetric cryptography. These embodiments have the advantage that they can work with shorter cryptograms and require less processing power than embodiments that rely on asymmetric cryptography.

A number of implementations have been described. Nevertheless, it will be understood that various modifications may be made. For example, elements of one or more implementations may be combined, deleted, modified, or supplemented to form further implementations. Accordingly, other implementations are within the scope of the appended claims. In addition, while a particular feature of the present invention may have been disclosed with respect to only one of several implementations, such feature may be combined with one or more other features of the other implementations as may be desired and advantageous for any given or particular application. While various embodiments of the present invention have been described above, it should be understood that they have been presented by way of example only, and not limitation. In particular, it is, of course, not possible to describe every conceivable combination of components or methodologies for purposes of describing the claimed subject matter, but one of ordinary skill in the art may recognize that many further combinations and permutations of the present invention are possible. Thus, the breadth and scope of the present invention should not be limited by any of the above described exemplary embodiments but should be defined only in accordance with the following claims and their equivalents.

The invention claimed is:

1. A method for securing interaction with an application by a user who remotely accesses said application through an access device that is connected to an application server hosting said application, comprising the steps of:

at a user authentication device capturing a signal emitted by the access device, said signal encoded with an authentication initiating message, said authentication initiating message comprising at least an application identifier data element corresponding to an identity of the application;

at the user authentication device decoding said signal and obtaining the authentication initiating message;

at the user authentication device retrieving from the authentication initiating message the application identifier data element;

by the user authentication device using the application identifier data element retrieved from the authentication initiating message to obtain a human interpretable representation of the application identity that the retrieved application identifier data element is corresponding to;

at the user authentication device presenting the obtained application identity representation to the user using a user output interface of the user authentication device;

at the user authentication device obtaining from the user, using a user input interface of the user authentication device, an approval for generating a response message for the application identity that the retrieved application identifier data element is corresponding to and making the response message available to a verification server;

at the user authentication device generating a dynamic security value using a first cryptographic algorithm parameterized with a cryptographic dynamic security value generation key and using at least one personalized data element that is associated with the user or the user authentication device, wherein the generated dynamic security value is cryptographically linked to the application identity presented to the user; and at the user authentication device generating the response message, the response message comprising at least the generated dynamic security value.

2. The method of claim 1 wherein all application dependent data used to obtain the application identity representation are obtained by the user authentication device from a source external to the user authentication device or from the authentication initiating message.

3. The method of claim 1, wherein the authentication initiating message further comprises a server credential that has been generated using a second cryptographic algorithm parameterized with a cryptographic server credential generation key, the method further comprising the steps of:

at the user authentication device retrieving from the authentication initiating message the included server credential;

at the user authentication device verifying the server credential using a third cryptographic algorithm parameterized with a cryptographic server credential verification key.

4. The method of claim 3 wherein the application identifier data element comprised in the authentication initiating message is cryptographically linked to the server credential.

5. The method of claim 1 wherein the step of generating a response message further comprises:

at the user authentication device including in the response message generated by the user authentication device a data element indicative of the application identity representation presented to the user.

6. The method of claim 1 further comprising the steps of:

at the user authentication device retrieving from the authentication initiating message transaction related data comprised in the authentication initiating message;

at the user authentication device presenting the retrieved transaction related data using a user output interface of the user authentication device; and wherein the generated dynamic security value is cryptographically linked to the transaction related data.

7. The method of claim 6, wherein the authentication initiating message further comprises a server credential that has been generated using a second cryptographic algorithm parameterized with a cryptographic server credential generation key, the method further comprising the steps of:

at the user authentication device retrieving from the authentication initiating message the included server credential; and at the user authentication device verifying the server credential using a third cryptographic algorithm parameterized with a cryptographic server credential verification key;

wherein the server credential is cryptographically linked to the transaction related data.

8. The method of claim 1 wherein the dynamic security value generation key comprises a secret personalized key; and wherein the user authentication device calculates the dynamic security value by cryptographically combining the dynamic security value generation key with at least a dynamic input value; and wherein said dynamic input value comprises at least one of a time-related value provided by a time-mechanism in the user authentication device, a counter-related value stored and maintained by the user authentication device, or a challenge comprised in the authentication initiating message.

9. The method of claim 8 wherein the user authentication device calculates the dynamic security value by cryptographically combining the dynamic security value generation key also with a data element that is indicative of the application identity representation presented to the user.

10. The method of claim 9, wherein the step of generating the dynamic security value uses a cryptographic key that is independent from the application identity.

11. The method of claim 8 wherein:

the user authentication device retrieves from the authentication initiating message transaction related data comprised in the authentication initiating message and presents these transaction related data to the user; and wherein the user authentication device calculates the dynamic security value by cryptographically combining the dynamic security value generation key also with data elements that are indicative of the transaction related data presented to the user.

12. The method of claim 11, wherein the step of generating the dynamic security value uses a cryptographic key that is independent from the application identity.

13. The method of claim 8, wherein the step of generating the dynamic security value uses a cryptographic key that is independent from the application identity.

14. The method of claim 1, further comprising the steps of:

making the generated response message available to a verification server;

at the verification server receiving the response message;

verifying the response message including verifying validity of the dynamic security value;

communicating the result of the verification of the response message to the application.

15. The method of claim 14 wherein the response message further comprises a data element that is indicative of an identity of the user or an identity of the user authentication device and wherein said data element indicative of the user identity or the user authentication device identity is used to determine the user identity and wherein the user identity is also communicated to the application.

16. The method of claim 15 wherein the user identity is determined also as a function of the application identity.

17. The method of claim 14, wherein the step of generating the response message comprises:

at the user authentication device including in the response message generated by the user authentication device a data element indicative of the application identity representation presented to the user; and wherein the method further comprises:

at the verification server verifying whether the data element that is indicative of the application identity representation presented to the user is consistent with the application identity indicated by the application identifier data element comprised in the authentication initiating message.

18. The method of claim 14 further comprising the steps of:
- at the user authentication device retrieving from the authentication initiating message transaction related data comprised in the authentication initiating message;
- at the user authentication device presenting the retrieved transaction related data using a user output interface of the user authentication device;
- wherein the generated dynamic security value is cryptographically linked to the transaction related data;
- at the user authentication device including in the response message generated by the user authentication device data elements indicative of the transaction related data presented to the user; and
- at the verification server verifying whether the data elements that are indicative of the transaction related data presented to the user are consistent with the transaction related data comprised in the authentication initiating message.

19. The method of claim 1 wherein the step of generating the dynamic security value uses a cryptographic key that is independent from the application identity.

20. An apparatus for generating authentication credentials comprising:
- a processing component adapted for processing data, the processing component comprising at least one of a microprocessor, a hardware controller, or an Application Specific Integrated Circuit;
- a storage component for storing data, the storage component comprising at least one of volatile or non-volatile memory;
- a user interface comprising a first user output interface for presenting outputs to a user and an input user interface for receiving input from the user; and
- a data input interface adapted to capture a signal emitted by a second user output interface of an access device that the user is using for remotely accessing an application over a computer network, said signal encoded with an authentication initiating message, said authentication initiating message comprising at least an application identifier data element corresponding to an identity of said application;
- whereby the processing component is adapted to
- decode said signal and obtain the authentication initiating message;
- retrieve from the authentication initiating message the application identifier data element;
- use the application identifier retrieved from the authentication initiating message to obtain a human interpretable representation of the application identity that the retrieved application identifier data element is corresponding to, and present the obtained application identity representation to the user using the first user output interface;
- obtain from the user, using the user input interface, an approval for generating a response message for the application identity that the retrieved application identifier data element is corresponding to and making the response message available to a verification server;
- generate a dynamic security value using a first cryptographic algorithm parameterized with a cryptographic dynamic security value generation key and using at least one personalized data element that is associated with the user or the apparatus, wherein the generated dynamic security value is cryptographically linked to the application identity presented to the user; and
- generate the response message, the response message comprising at least the generated dynamic security value.

21. The apparatus of claim 20, wherein the processing component is further adapted to present the generated response message to the user using the first user output interface.

22. The apparatus of claim 20 further comprising a data communications interface adapted to communicate said response message to a verification server.

23. The apparatus of claim 20, wherein the processing component is further adapted to generate the dynamic security value using a cryptographic key that is independent from the application identity.

24. A system for securing interaction with an application by a user who remotely accesses said application through an access device that is connected to an application server hosting said application, comprising:
- a plurality of apparatus for generating authentication credentials, each apparatus comprising:
- a processing component adapted for processing data, the procession component comprising at least one of a microprocessor, a hardware controller, or an Application Specific Integrated Circuit;
- a storage component for storing data, the storage component comprising at least one of volatile or non-volatile memory;
- a user interface comprising a first user output interface for presenting outputs to a user and an input user interface for receiving input from the user; and
- a data input interface adapted to capture a signal emitted by a second user output interface of an access device that the user is using for remotely accessing an application over a computer network, said signal encoded with an authentication initiating message, said authentication initiating message comprising at least an application identifier data element corresponding to an identity of said application; whereby the processing component is adapted to:
- decode said signal and obtain the authentication initiating message;
- retrieve from the authentication initiating message the application identifier data element;
- use the application identifier retrieved from the authentication initiating message to obtain a human interpretable representation of the application identity that the retrieved application identifier data element is corresponding to, and present the obtained application identity representation to the user using the first user output interface;
- obtain from the user, using the user input interface, an approval for generating a response message for the application identity that the retrieved application identifier data element is corresponding to and making the response message available to a verification server;
- generate a dynamic security value using a first cryptographic algorithm parameterized with a cryptographic dynamic security value generation key and using at least one personalized data element that is associated with the user or the apparatus, wherein the generated dynamic security value is cryptographically linked to the application identity presented to the user; and
- generate the response message, the response message comprising at least the generated dynamic security value; and
- a verification server adapted to: receive the response message generated by the processing component, verify the received response message including verifying validity of the dynamic security value comprised in the response message, and communicate the result of the verification of the response message to the application.

* * * * *